Jan. 12, 1932.  A. G. RAYBURN  1,840,870
POWER TRANSMISSION
Filed March 27, 1926  15 Sheets-Sheet 1

Inventor
Alden G. Rayburn
By William A. Strauch
Attorney

Jan. 12, 1932.   A. G. RAYBURN.   1,840,870
POWER TRANSMISSION
Filed March 27, 1926   15 Sheets-Sheet 3

Jan. 12, 1932.  A. G. RAYBURN  1,840,870
POWER TRANSMISSION
Filed March 27, 1926  15 Sheets-Sheet 4

Jan. 12, 1932.  A. G. RAYBURN  1,840,870
POWER TRANSMISSION
Filed March 27, 1926    15 Sheets-Sheet 5

Inventor
Alden G. Rayburn
By William A. Strauch
Attorney

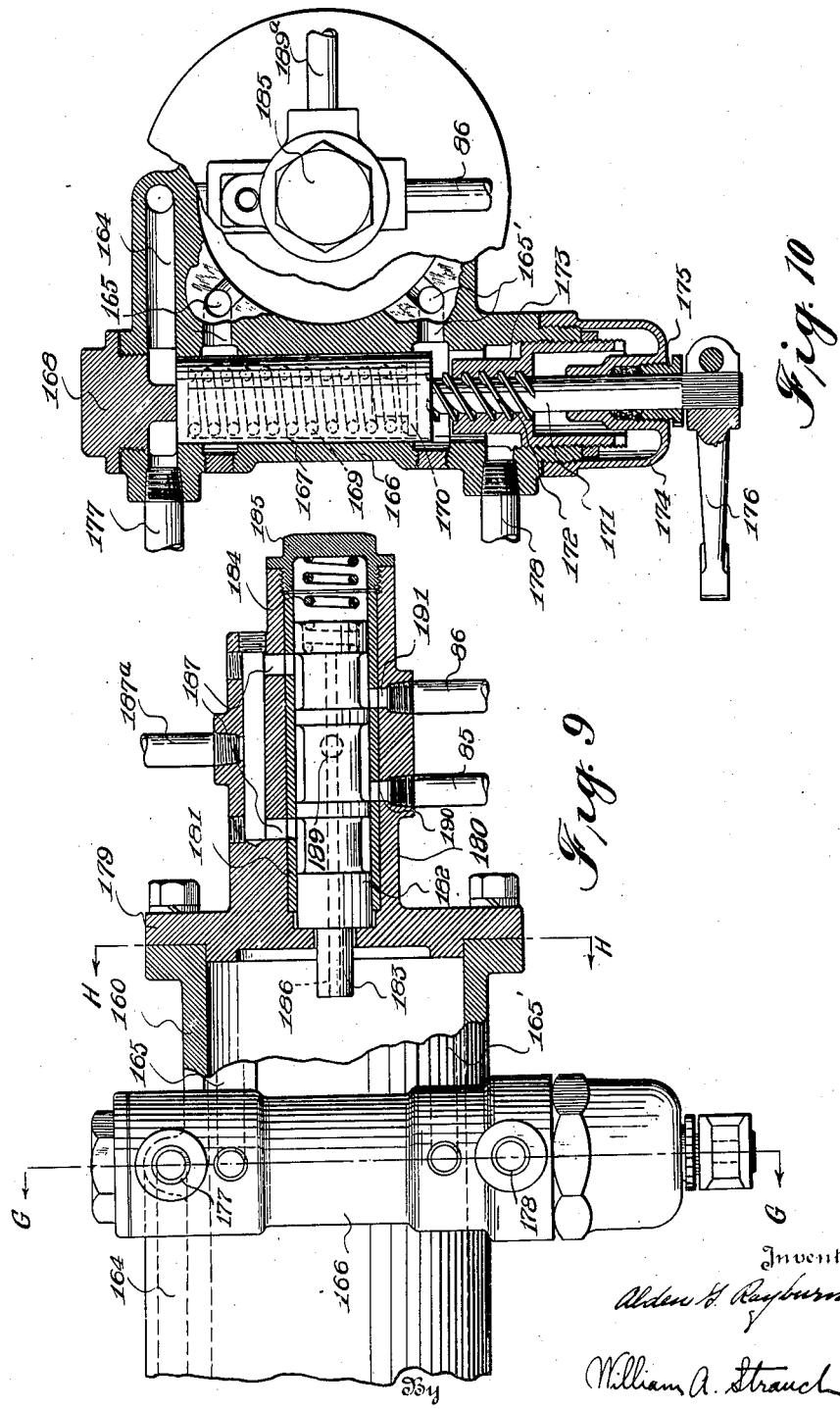

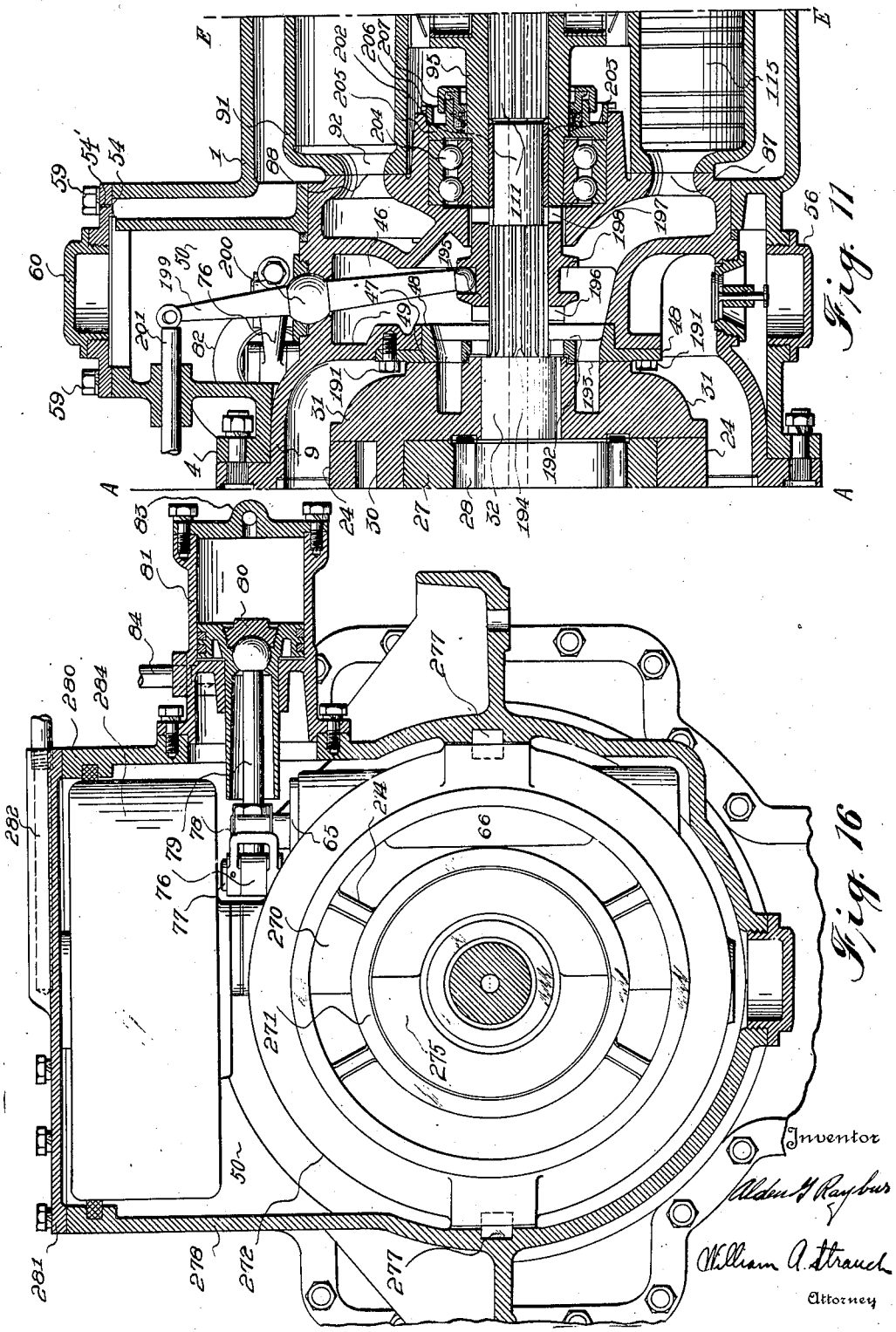

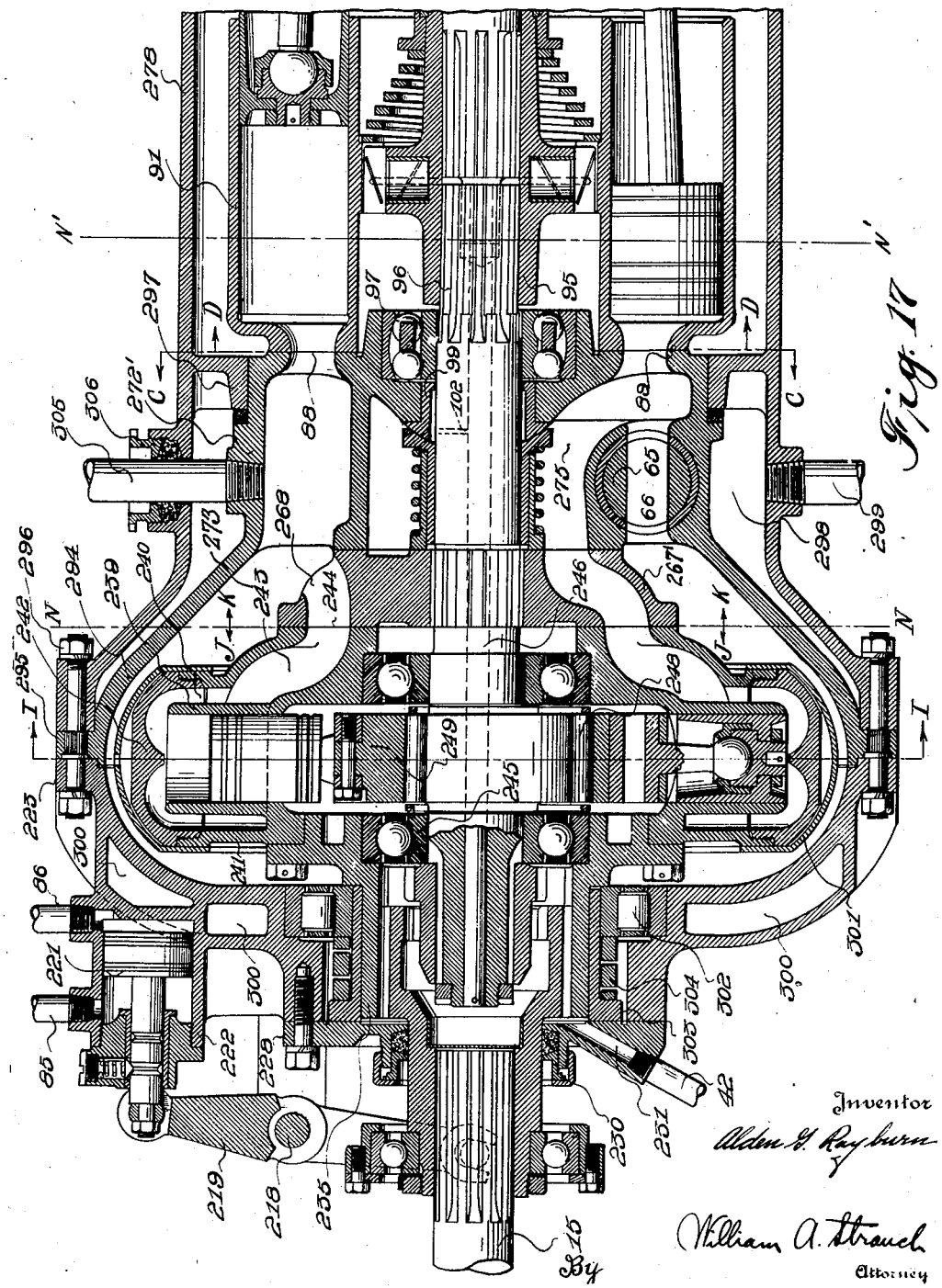

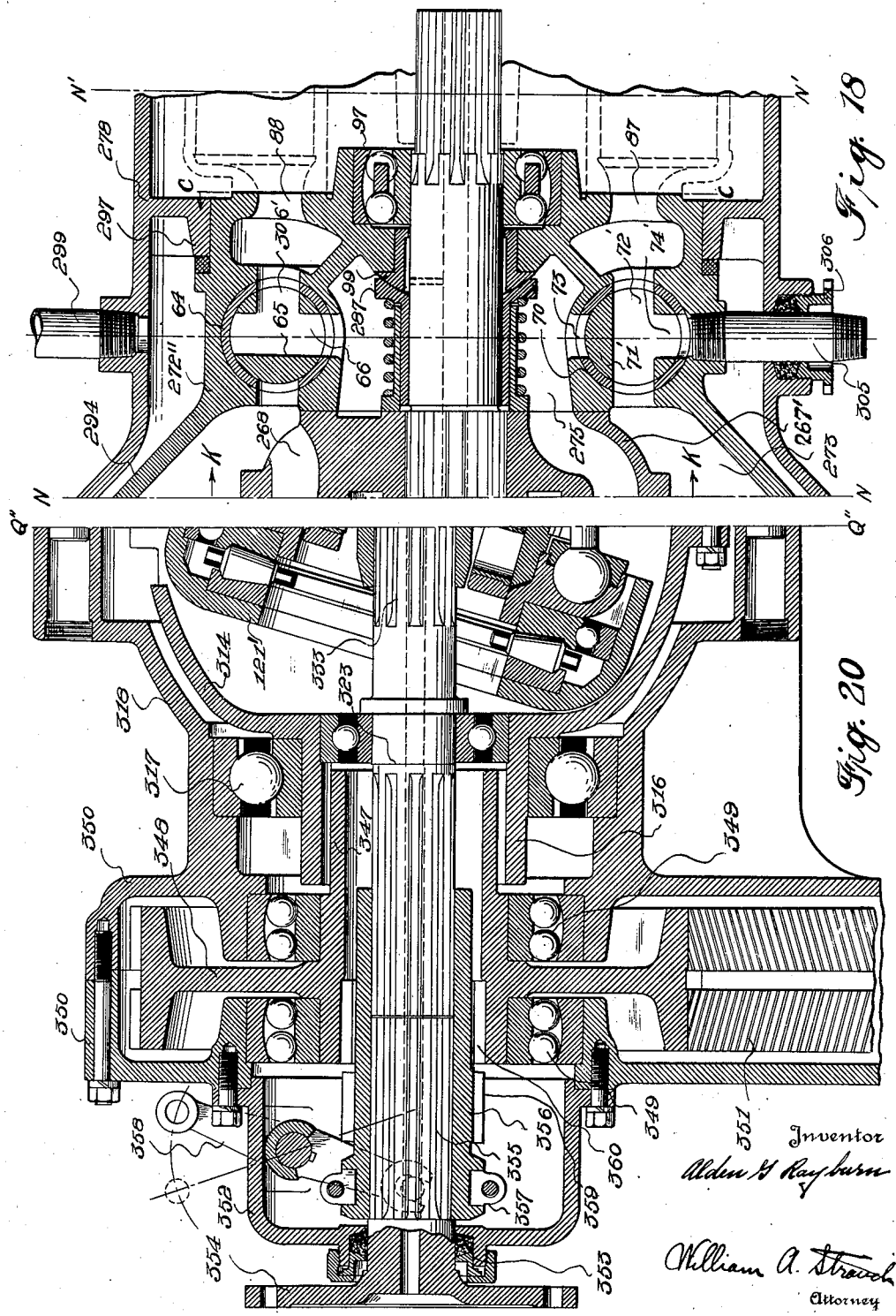

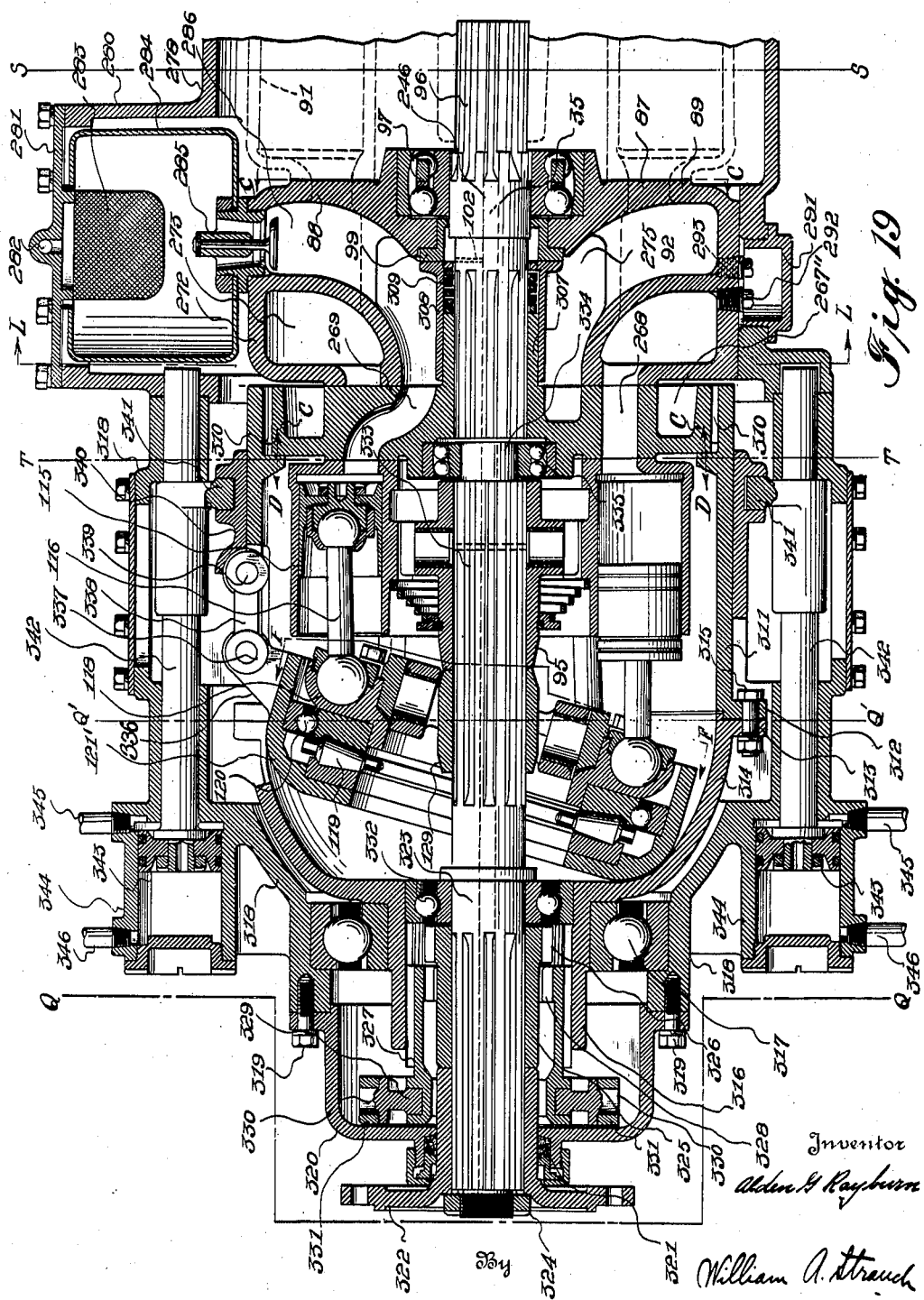

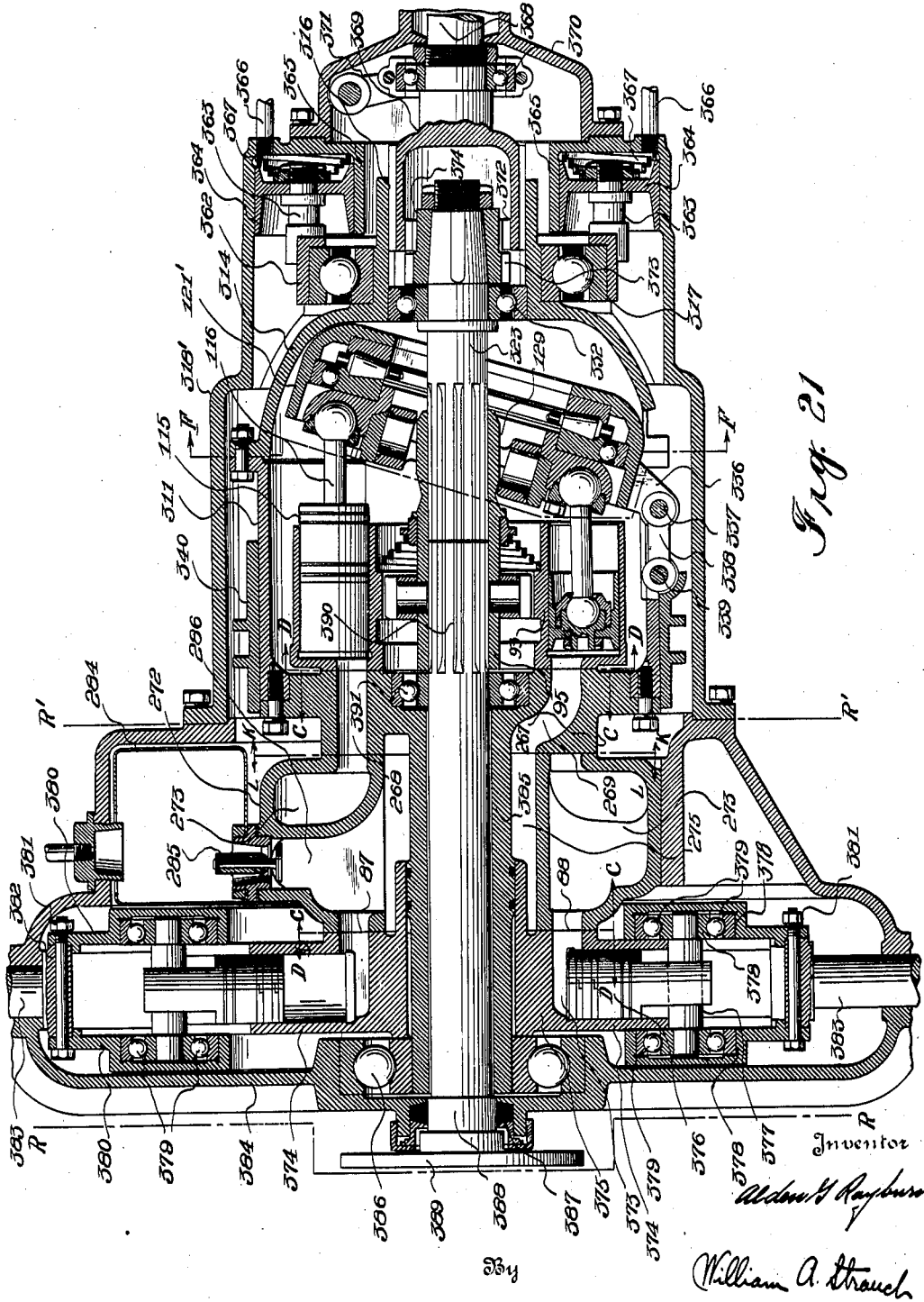

Patented Jan. 12, 1932

1,840,870

UNITED STATES PATENT OFFICE

ALDEN G. RAYBURN, OF SAUSALITO, CALIFORNIA, ASSIGNOR, BY MESNE ASSIGNMENTS, TO AUTOMOTIVE ENGINEERING CORPORATION, A CORPORATION OF DELAWARE

POWER TRANSMISSION

Application filed March 27, 1926. Serial No. 97,921.

The present invention relates to variable speed power transmissions.

More particularly the invention relates to variable speed hydraulic power transmissions of the character in which the maximum circulation of fluid occurs when the speed reduction and torque multiplication are maximum, and in which as the speed reduction and torque multiplication decrease, the circulation of fluid is decreased. Various transmissions of this type have heretofore been proposed which have been operative with varying degrees of success. The primary difficulty in providing a commercially satisfactory transmission of this type which will handle relatively large powers lies in provision of satisfactory simplified pump and motor combinations which will operate efficiently at high speeds and fluid pressures without excessive leakage of fluid from the system, in which the losses are relatively low, and in which the parts are of a size and weight which will compare favorably with various mechanical and electrical variable speed power transmissions now in use. In my co-pending application Serial Number 58,806 filed September 26, 1925, I have disclosed improved rotary pump and parallel cylinder motor combinations for use in improved hydraulic systems of the type mentioned and in which novel valving and control arrangements are shown. The principles therein disclosed are applicable to various combinations of radial and parallel cylinder pump and motor units and present basic arrangements of valving and controls for systems of the type mentioned which permit the successful commercial operation of these systems.

Accordingly, objects of the invention are to provide novel and simplified valving arrangements and controls for use in hydraulic transmissions utilizing either rotary gear or plunger parallel or radial cylinder pumps with rotating parallel or radial cylinder motors, in which the bearing pressures and surface areas are balanced, proportioned and rangements and controls for use in hydraulic in transmission of heavy power for successful commercial operation in marine, locomotive, and automotive drives using internal combustion engines, and for various other types of speed reducing and torque multiplying drive arrangements.

Still further objects of the invention are such as may be attained by utilization of the various combinations, sub-combinations and principles hereinafter more fully set forth and pointed out in the detailed description of the various embodiments of the inventions, and as defined by the terms of the appended claims.

Referring to the drawings:

Figure 9 is a fragmental detail view partially in section showing automatic control valve arrangement for the form of invention shown in Figure 2.

Figure 10 is a fragmental view partially in section taken along the lines G—G and H—H of Figure 9.

Figure 11 is a sectional elevation of a modified arrangement of parts adapted to be substituted for the parts included between the lines A—A and E—E of Figures 1 and 2.

Figure 16 is a section taken along line L—L of Figures 12, 19 and 21.

Figure 17 is a longitudinal section of the essential parts of another modification of the invention.

Figure 18 is a detailed horizontal section of a modified valve arrangement which may be substituted for the section of the transmission shown in Figure 17 between the lines of N—N and N'—N'.

Figure 19 is a longitudinal section of a further modification of the invention.

Figure 20 is a fragmental sectional view of a modified arrangement of parts which may be substituted for the parts shown between the lines Q—Q and Q'—Q' of Figure 19.

Figure 21 is a longitudinal section showing still another modification of the invention.

Figure 1:
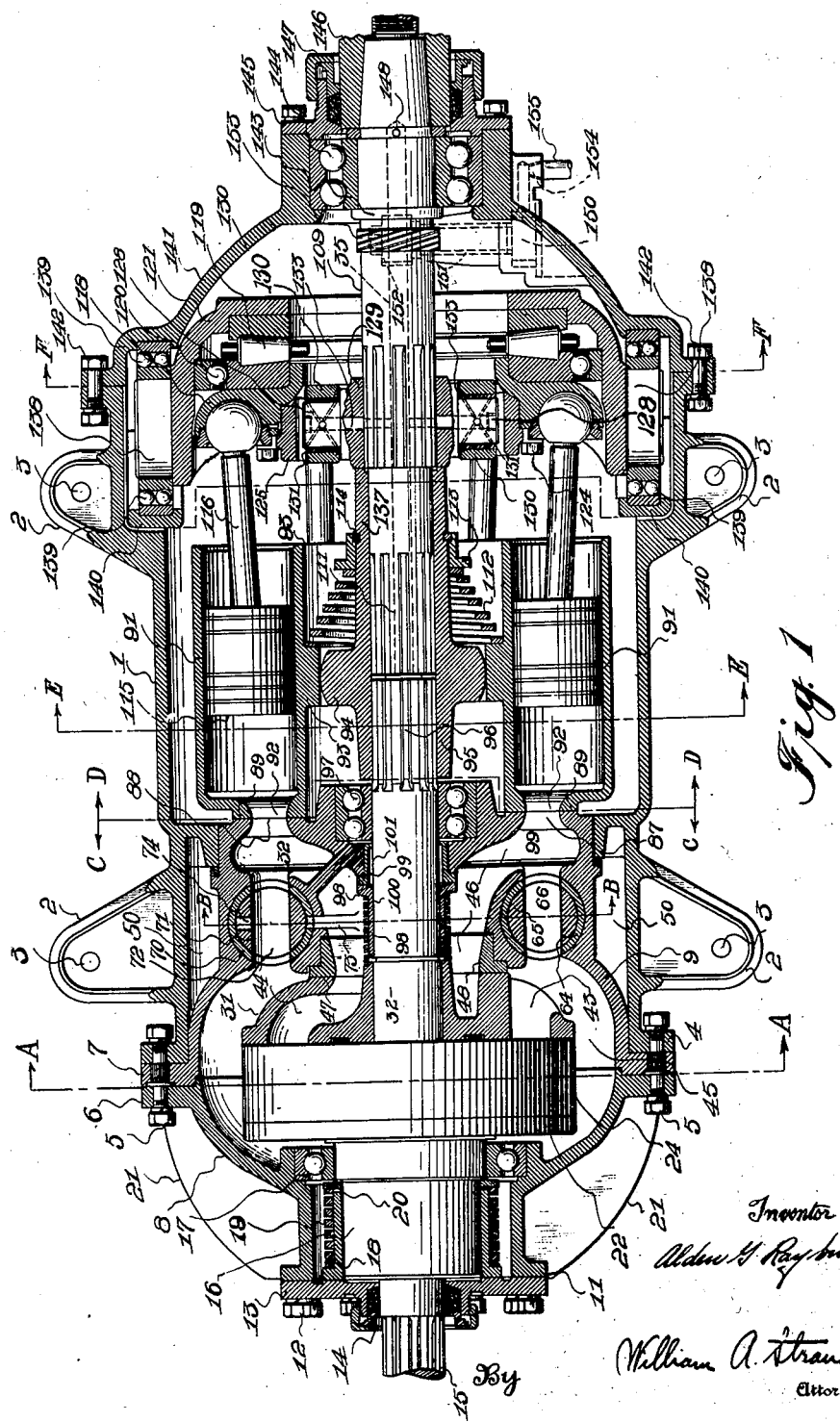
Figure 1 is a horizontal section taken through one form of my invention.

Referring to Figures 1 to 10, a central casing 1 is provided and has formed integrally therewith securing legs or projections 2 in which securing bolt holes 3 are formed. Secured to the flange 4 of the casing 1 by means of the special bolts 5 are flanges 6 and 7 of stationary pump housings 8 and 9. Bolts 5 are provided with a serrated section and a locating collar which hold them against turning in flange 7 of the pump housing 9. Bolts 5 are seated in the flange 7 with the opposite threaded ends thereof extending through flanges 4 and 6, in this manner permitting a ready removal of the entire pump assembly or removal of the pump housing section 8 while the housing section 9 remains secured to casing 1. Secured to the end flange 11 of housing section 8 by means of studs 12 is a cap 13 provided with a central packing gland 14 of any suitable construction. Extending through the gland structure 14 into the interior of the housing section 8 is the driving shaft section 15. Secured to or preferably formed integrally with the end of the driving shaft section 15 is the driving member 16 of a rotary pump which is journalled in a ball or anti-friction bearing 17 supported from the housing 8. A sealing sleeve or member 18 is slidably supported on member 16 and has the end sealing surface thereof forced into engagement with a suitably finished surface of the cap 13 by means of the helical spring 19 interposed between a shoulder of the sealing member 18 and a collar or washer 20 supported on and abutting against a shoulder formed on the member 16. Formed on the exterior of the housing section 8 are the ribs 21 which strengthen the head and at the same time provide a large heat radiating area for dissipation of heat generated in the system.

Figure 2:
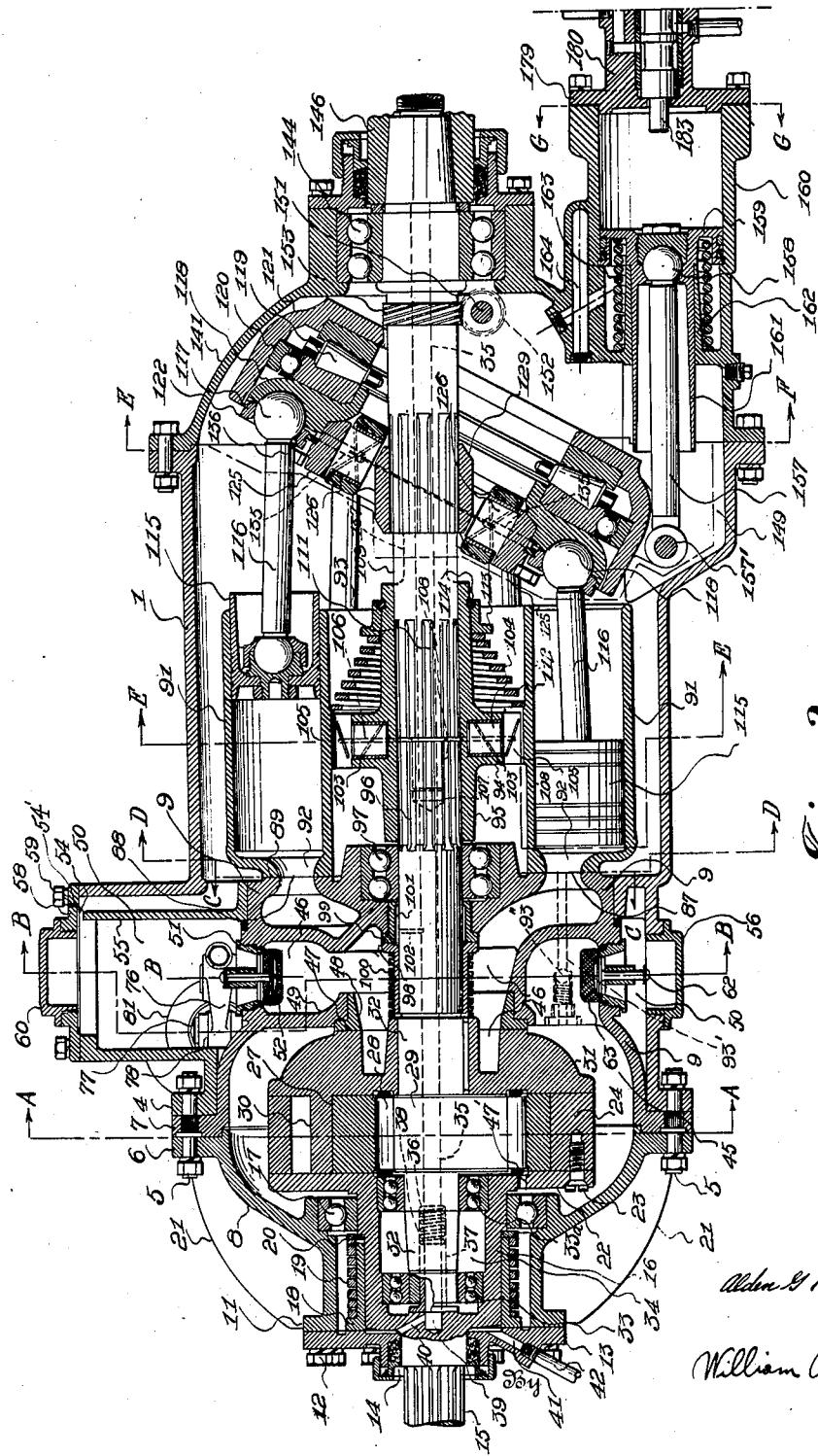
Figure 2 is a longitudinal vertical section taken through the form of invention shown in Figure 1 with certain parts rotated slightly from their true position for clarity of illustration.
Figure 3:
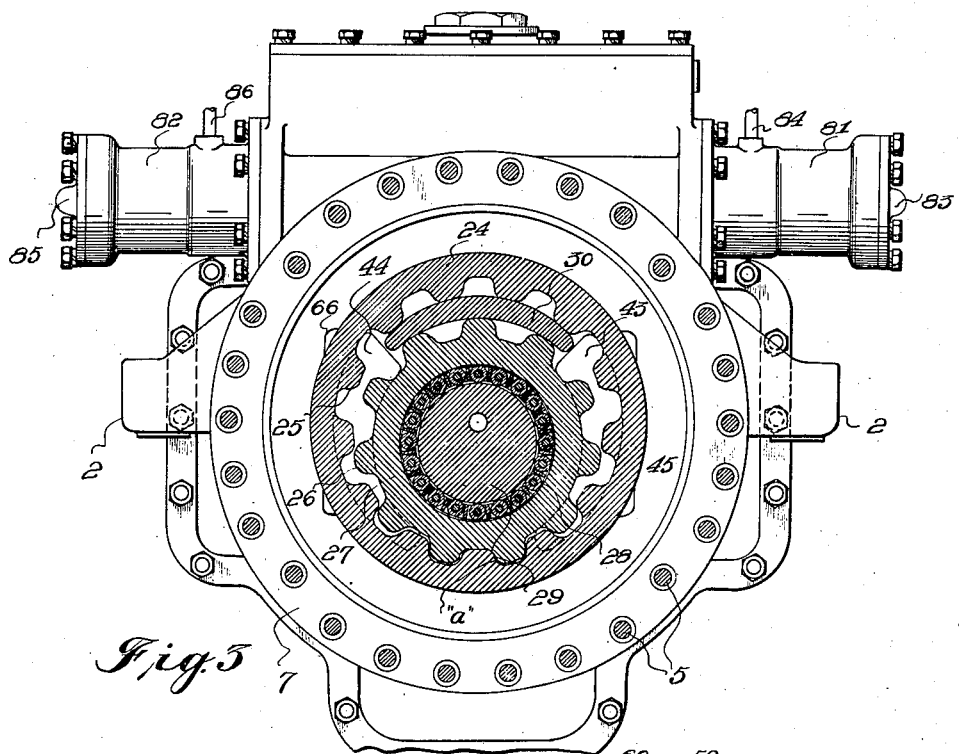
Figure 3 is a sectional view taken along line A—A of Figures 1 and 2.

Secured to or preferably formed integrally with the pump driving member 16 is pump side wall 22 which has rigidly secured thereto by means of the counter sunk screws or studs 23, a pump ring gear 24 (Figures 1, 2 and 3) on which are formed the gear teeth 25 (Figure 3). Teeth 25 mesh with the teeth 26 of a pinion 27 which is journaled on anti-friction rollers 28 in turn guided between suitable races and spacing members and supported on the eccentric 29. Pinion 27 is accordingly rotatable about a point eccentric with relation to the axis of rotation of the ring gear 24. The tooth curve of the ring gear and pinion teeth are generated in a well known manner to maintain either a continuous sliding or rolling contact at the point "a" indicated in Figure 3 and sufficient clearance is provided in the thickness of the teeth to prevent trapping of the fluid in the pockets formed between the meshing teeth. The external diameter of the pinion teeth and the internal diameter of the ring gear are such that opposite the point of contact "a" the roofs of the teeth are in sealing contact with sealing segment 30 of the pump element 31. (Figures 1 and 2.) Pump element 31 is rigidly keyed to tail shaft section 32. The forward end of the tail shaft section 32 is supported in ball bearings 33 and 33a which in turn are mounted in the inner chamber 34 of the pump driving element 16. Drilled centrally through the shaft section 32 is a passage or conduit 35 for the distribution of lubricating fluid to the mechanism as will more fully hereinafter appear. Slidably fitting in cylindrical recess 36 formed in the end of the shaft section 32 is a sealing sleeve member 37, the forward face of which is forced by means of a helical spring 38 seated in the recess 36 into engagement with a sealing face formed on the end wall of chamber 34. A central opening through sealing member 37 registers with a recess 39 formed in the end wall of chamber 34 connecting recess 39 to conduit 35. A passage 40 is drilled from the exterior of pump element 16 connecting recess 39 to a lubricating and sealing oil space formed between the end of member 16 and a recess in cap 13. A conduit 41 drilled through cap 13 connects a supply pipe 42 for lubricating fluid to the space between cap 13 and the end of member 16, and supplies lubricant under pressure to conduits 40, recess 39 and conduit 35.

Formed in the pump element 31 are the high pressure or fluid discharge port 43 and the fluid intake port 44 (Figures 1 and 3).

Port 43 communicates with a high pressure fluid chamber 45 surrounding the pump elements and formed by the housings 8 and 9 and port 44 communicates with a central cylindrical intake chamber 46. A passage 47' (Figure 2) drilled through the pump side wall 22 connects the high pressure fluid chamber 45 with the chamber 34 of the pump driving element 16. In operation bearings 17, 33 and 33a will be surrounded by and immersed in high pressure fluid which is sealed against substantial leakage from chambers 34 and 45 by sealing members 18 and 37 which are held in position by their springs 19 and 38 and by the fluid pressure in the chambers. It is to be noted that any leakage from the high pressure fluid chambers will be inward to the lubricating conduit 35 and will not be lost from the system.

Pump element 31 is provided with a suitable bearing and sealing surface 47 held against the end face of a suitable metallic hardened steel insert 48 supported in a wall 49 of the pump housing section 9. The proportioning of the various areas and surfaces of the pumping arrangement heretofore described are essential and important elements of my invention. The various areas and parts under pressure are so proportioned that the pumping elements are held together by a sufficient over-balance in the external pressures over the internal pressures developed to maintain the parts relatively movable in sealing relation and pumping relation to each other independently of the internal pressure which may be generated in the pump and without too great an over-balance so that excessive pressures and corresponding losses due to heat generation of the relative rotating parts and bearing surfaces are avoided. The balance of internal and external total pressures is so proportioned that an effectual seal is maintained and deflection of the side walls is prevented while free expansions of the various parts without binding is permitted as the temperatures rise during operation and the necessity for utilizing excessive clearances to permit expansion of parts due to temperature rise is avoided. The external areas are furthermore proportioned relatively so that the surface 47 of the pump element 31 is held against the end surface of the insert 48 with just sufficient pressure to maintain an efficient seal without permitting excessive end thrust or bearing pressures to develop at this point when delivering high fluid pressures. It will be noted that when no fluid pressures are being developed springs 19 and 38 will function to hold the parts in engagement with sufficient pressure to permit the initial building up of pressures in the high pressure chamber 45.

In operation of the pump mechanism so far described rotation of the driving shaft section 15 causes rotation of the pump driving member 16, side wall 22, and the ring gear 24. With the shaft section 32 and the eccentric 29 held stationary, rotation of the ring gear 24 will cause a driving of the pinion 27 on the roller bearing 28 causing fluid to be drawn from the inlet port 44 and forced through the outlet port 43 into the high pressure chambers 45 and 34 in obvious manner. Fluid pressures will build up in the chambers 34 and 45 and the parts of the pump will be held together with pressures predetermined by the ratios of the various areas as above pointed out maintaining the parts in sealed pumping relation and without permitting excessive bearing pressures to develop regardless of how high the fluid pressures may rise. At the same time expansion of the parts due to changes in temperature will be permitted without causing binding or disturbing the sealing relation of the parts, and the over balanced external pressures will prevent side wall deflections. The anti-friction bearings will be immersed in the fluid, and fluid sufficient to lubricate the various parts effectively will find its way on to the bearing surfaces because of the centrifugal action of the rotating parts which will tend to force the fluid outward from the central fluid pockets. By permitting or causing shaft 32 to rotate the relative movement of the ring gear and pinion teeth may be varied per revolution of the ring gear and the volumetric capacity of the pump may in this way be controlled. It will be seen that an efficient rotary pumping unit has been provided in which the pressures are balanced, expansion of the various parts is permitted as heating occurs without causing binding or a variation of the sealing effect of the rotating surfaces or of the bearing pressures, and at the same time very high pressures may be developed without causing side wall deflections of the pumping elements. While the pump unit has been designed especially for use in fluid power transmissions, it will be obvious that the novel principles herein set forth are applicable to pumps for various uses. By anchoring the shaft section 32 in a stationary casing, a fixed capacity pump capable of general application is provided, or by providing means for varying the speed of shaft 32 an efficient variable capacity rotary pump is obtainable.

Figure 4:
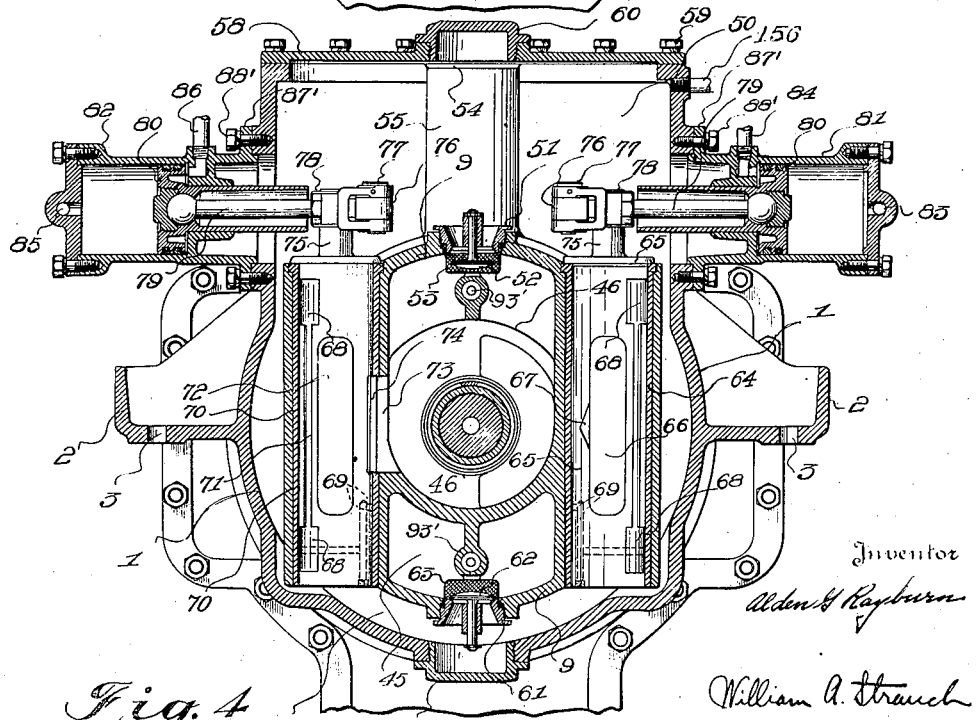
Figure 4 is a section taken along line B—B of Figures 1 and 2.

The low pressure chamber 46 surrounds the shaft section 32 and extends through insert 48 and the housing section 9. Formed in the casing 1 is a fluid storage reservoir 50 (Figures 2 and 4). Located in the upper part of the casting 9 is a check valve comprising a seat 51 and a valve member 52 through which the fluid from the reservoir 50 passes into the low pressure chamber 46 of the pumping unit. A protecting wire basket 53 may be provided to prevent inadvertent dropping of valve 52 into chamber 46. An overflow opening 54 (Figures 2 and 4) is preferably provided at the top of wall 55 of chamber 50 to permit excess of fluid in the storage reservoir 50 to flow into the casing 1. To maintain the air pressure within the chamber 50 and the casing 1 at atmospheric pressure and at the same time prevent loss of fluid by leakage, a vent 54' is provided through the cap 58. It will be noted that the chamber 46 is large and has a substantial volume or space disposed above the central point of intake of the inlet 44 for the pump. Fluid in the transmission system accordingly passes through the chamber 46 to the intake side of the pump at a considerably reduced velocity permitting entrained air to escape from the system through the air trap formed by the enlarged space in chamber 46 above the pump intake point, out through check valve 51 and out of the top of reservoir 50 without causing emulsification or thinning of the fluid in the system. The reduction of velocity of the fluid before it passes into the intake side of the pump and the arrangement whereby the air may rise out of the fluid into a trap which removes it from the system is an important and essential feature of my invention.

Referring to Figure 4 it will be noted that the storage space 50 surrounds the pump housing section 9 and aids in cooling the fluid in the circulating system during operation. A drain plug 56 for withdrawing the fluid from the bottom of the storage reservoir 50 is provided in the bottom of the casing 1 and a suitable cover plate 58 secured to the upper part of the casing 1 is provided. A filling plug 60 for supplying fluid to the transmission is preferably provided in cap 58. An inlet valve comprising valve seat 61 together with the check valve member 62 and the protecting wire basket 63 is provided in the lower part of the housing 9 and connects the storage reservoir 50 with the high pressure chamber 45. This valve permits entry of fluid from the storage reservoir when the tail shaft section 32 becomes the driving member as frequently occurs in practice. Under such conditions the circulating system is maintained filled with fluid, even though chamber 45 becomes the low pressure chamber and 46 becomes the high pressure chamber.

Seated in the housing section 9 is a valve seat 64 in which a rotatable cylindrical clutch valve 65 is supported. In the position of parts shown in Figure 1 the valve 65 completes a passage 66 inter-connecting the high pressure chamber 45 with the low pressure chamber 46 and the mechanism will be in neutral position. With valve 65 turned at right angles to the position shown in Figure 1, the passage 66 is closed and the fluid will be compelled to pass under pressure through the system. To provide for a gradual cutting off and rise of fluid flow through the passage 66 as the valve is closed and opened in operation, a relief recess 67 (Figure 4) is provided in the valve 65. To prevent binding of the valve 65 due to the fluid pressure exerted thereon when in closed position, a balancing recess 68 is formed in the surface of valve 65 through which fluid under pressure is admitted from the chamber 45 by means of the conduits 69 drilled through the valve 65 in such manner that fluid under pressure from the chamber 45 will pass therethrough when valve 65 is in closed position. Located in the housing 9 diametrically opposite the valve 65 is a cylindrical valve seat 70 in which the cylindrical locking valve 71 is seated. Now if the valve 71 is caused to rotate closing off its passage 72 and the valve 65 is also caused to shut off passage 66 then both passage 66 and 72 will be closed and the fluid will be locked in the high pressure chamber 45 resulting in a locking of the pump parts and transmission of power directly from the driving shaft 15 to the tail shaft section 32 will be obtained. With the valve 71 in closed position, the opening 72 therein will be brought into registration with slot 73 communicating with the low pressure chamber 46 and a slot 74 in valve 71 will communicate with the high pressure side of the motor unit. In this way when the fluid is locked in the high pressure chamber for direct power transmission, the cylinders of the motor unit are in communication with the low pressure chamber 46 thus relieving fluid pressure on the motor unit. To provide for balancing the valve 71 when in closed position, a balancing recess 68 together with the conduits 69 for supplying fluid under pressure thereto are provided in the manner set forth for the similar parts of the valve 65.

The valves 65 and the valve 71 may be operated manually or in any other suitable manner. As shown in Figure 4 the valves 65 and 71 are provided with the operating spindles 75 to which are secured ends of operating arms 76. The other ends of arms 76 are secured by means of pins 77 to suitable jaw shaped ends 78 of the piston rods 79. At their opposite ends piston rods 79 are connected to the pistons 80 by means of ball and socket connections and pistons 80 are supported in and adapted to reciprocate in the cylinders 81 and 82. Suitable conduits 83, 84, 85 and 86 for supplying operating fluid to the cylinders 81 and 82 are provided. Cylinders 81 and 82 are preferably detachably secured to casing section 1 by means of the flanges 87' formed integrally therewith and the securing studs or cap screws 88'. Fluid under pressure, preferably compressed air under suitable manual control is supplied to cylinder 81 for operating clutch valve 65. The operating fluid for the cylinder 82 through conduits 85 and 86 is also preferably compressed air, and while this may be under manual control in obvious manner, the control for the fluid supplied to this cylinder to close valve 71 is preferably automatic and the opening is preferably under manual control as will more fully hereinafter appear.

Figure 5:
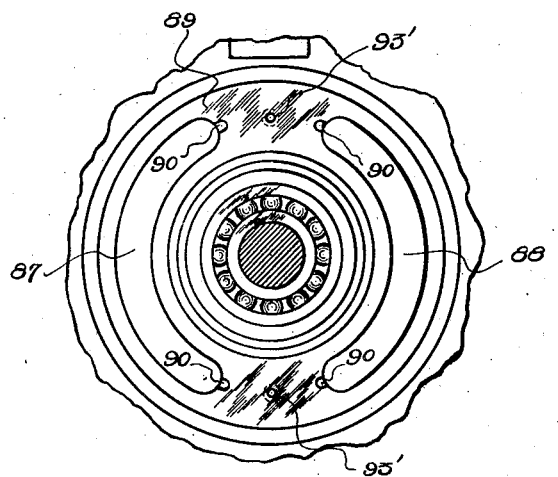
Figure 5 is a section taken along line C—C of Figures 1, 2, 12, 17, 18, 19, 21 and 22.

The low pressure or intake chamber 46 of the pump communicates with the motor discharge valve port 87 and the high pressure chamber 45 of the pump communicates through the passage 72 with the motor feed valve port 88 located in the end face 89 of the pump housing section 9 (Figures 1, 2 and 5). Relief recesses 90 are provided in the valve face 89 to relieve the sudden opening and cutting off of the motor cylinders 91 through the ports 92 thereof formed in the end face of cylinder block 93 in which cylinders 91 are integrally formed and supported. To prevent trapping of fluid in any of the cylinders 91 when positioned with ports 92 thereof against the lands or spaces between the ends of ports 87 and 88 in the valve face 89 the relief passages 93' (Figures 2, 4, and 5) together with the relief valves 93'' are provided between face 89 and the chamber 45 through housing section 9.

Cylinder block 93 is supported centrally on collar 94 of the coupling member 95 into which splined end 96 of the shaft section 32 slidably fits. Splined end 96 of the shaft section 32 extends beyond supporting ball or anti-friction bearing 97 for the shaft section 32, bearing 97 being supported in a suitable recess formed therefor in the end of housing section 9. To seal the low pressure chamber 46 against loss of fluid by leakage along the shaft section 32 past bearing 97, a sealing sleeve member 98 is slidably supported on the shaft 32 and has the end sealing face thereof held against the end face of sleeve member 99 fitted in the housing section 9 by means of a helical spring 100 interposed between the pump element 31 and a shoulder formed on the sleeve 98. To insure the maintenance of a seal between the members 98 and 99 and to maintain a proper supply of lubricant for bearing 97 a recess 101 is formed in the sleeve 99 around the shaft 32 and the oil conduit 35 is connected to the recess 101 by means of a conduit 102 drilled in the shaft 32. Lubricating and sealing oil under pressure will pass outward from the conduit 35 through conduit 102 to the recess 101 and to the bearing 97.

The periphery of collar 94 of the coupling 95 is spherical in contour as shown in Figure 1, and fits snugly into a central bore formed in the cylinder block 93 supporting the cylinder block and at the same time permitting a universal movement of the cylinder block and cylinders with relation to the supporting collar 94. Seated in diametrically opposite recesses in the collar 94 are bushings 103 (Figures 2 and 7) in which extensions 104 of driving members are rotatably supported.

Formed integrally with the extensions 104 are the rectangular heads 105 which fit slidably into key-ways formed in the cylinder block 93. Bushings 103 and heads 105 are provided with suitable oil grooves which are supplied with lubricant by means of the conduits 106 drilled through members 104 and 105 and through coupling member 95 to the end of splined section 96 of shaft 32. It will be noted that the method of supporting the cylinder block 93 on the spherical surface of the collar 94 relieves members 105 of the weight of the cylinders and members 105 simply function to transmit the driving forces from the cylinder block 93 to the connecting member 95. Sufficient clearance is allowed between the ends of members 105 and the cylinder block 93 to permit the universal movement of the cylinder block and effect a proper seating of the end face of the cylinder block against the timing valve face 89 of the housing section 9. It will also be noted that a proper supply of lubricant is maintained on members 104 and 105 through the conduits 106 and fed from the central lubricating conduit 35.

Figure 7:
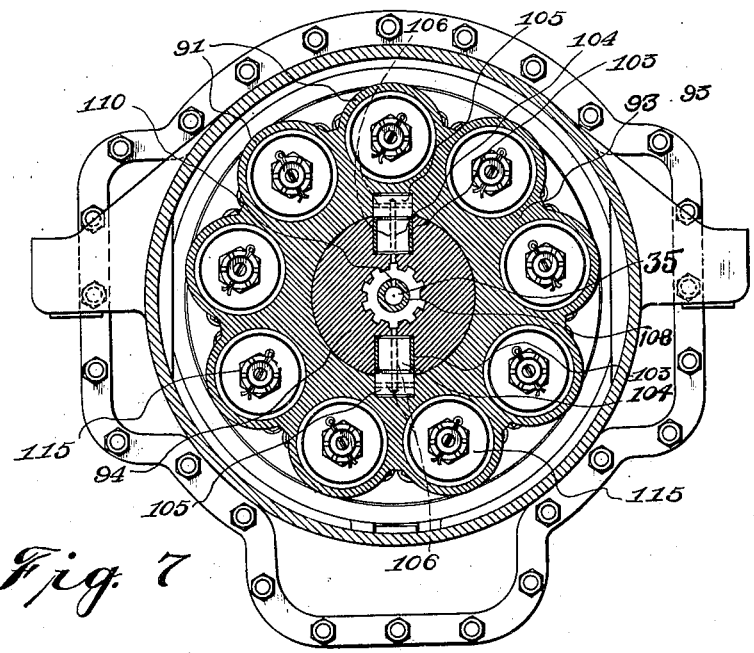
Figure 7 is a section taken along line E—E of Figures 1 and 2.

Drilled in the end section 96 of the shaft 32 is a pilot recess 107 in which the pilot extension 108 of the tail shaft section 109 is guided (Figures 2 and 7). Lubricating conduit 35 is extended centrally through the pilot extension 108 and the tail shaft section 109 as shown in the drawings, and a lubricating conduit 110 is drilled through extension 108 to feed conduits 106. The end 111 of the shaft section 109 is slidably splined to coupling member 95 so that coupling member 95 connects the shaft sections 32 and 109 in assembled relation for rotation as a unit with the motor cylinder block 93.

Figure 8:
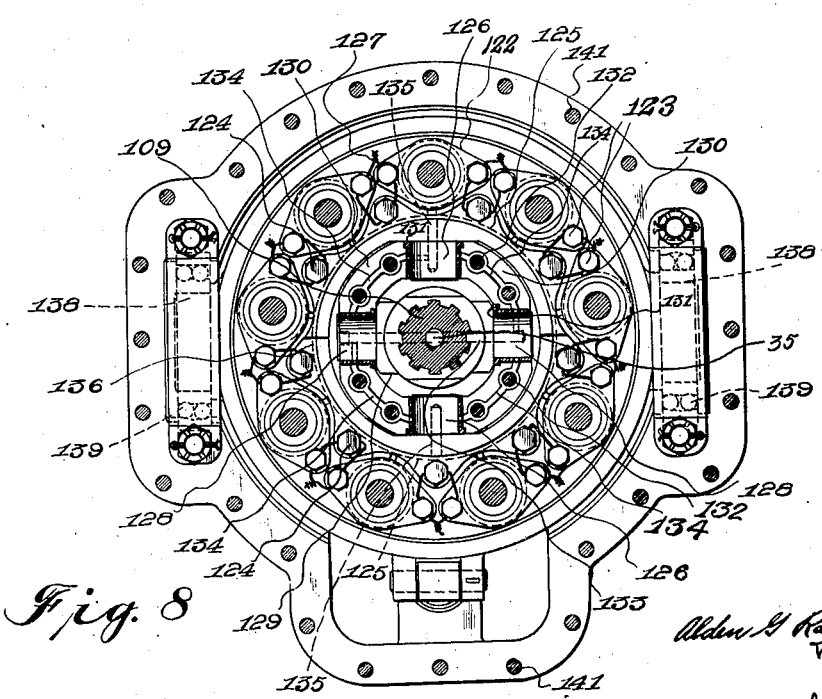
Figure 8 is a section taken along line F—F of Figures 1 and 2.

The cylinder block 93 is normally held with the end face thereof in engagement with valve face 89 of housing section 9 by means of a coiled helical spring 112, one end of which abuts against a collar 113 detachably secured to the coupling member 95 by means of a split ring 114. Supported in cylinders 91 are pistons 115 to which are secured by the means of detachable and replaceable ball and socket joints, the ends of the piston rods 116. The opposite ends of the piston rods 116 are connected by means of suitable ball and socket connections 117 to a rotatable plate 118 which is supported by means of the roller bearing 119 and the ball bearing 120 in variable angle backing plate 121. The ball ends 117 of the piston rods 116 are held seated against the plates 118 by means of the removable caps 122 secured in position by the studs 123. Forced into the plate 118 and rigidly secured thereto by means of the bolts 124 are the halves of a split trunnion ring 125 upon which the inwardly extending trunnion members 126 are integrally formed. A securing wire 127 is preferably passed through the heads of the cap screws or studs 123 and 124 and locks them in position against inadvertent loss. The trunnion members 126 are connected to trunnion members 128 of a central drive member 129 by means of a pair of connecting collars 130. Suitable bushings 131 for the trunnions 126 and 128 are supported between collars 130 which hold the parts in assembled relation and are held together by means of suitable bolts 132 (Figure 8). Suitable oil grooves are provided in bushings 131 and are fed from the central conduit 35 through passages 133 (Figure 8) drilled through trunnions 128 and the central drive member 129, and the passages 133 communicate through annular oil grooves and drilled holes formed in the bushings 131 with the oil ducts 134 formed in the collars 130. The oil ducts 134 are connected to conduits 135 by suitable annular grooves formed in and holes drilled through bushings 131 and conduits 135 communicate with the circular distributing duct 136 formed in the plate member 118. From the distributing duct 136 oil passes through suitably formed channels to the ball and socket joints 117 of the piston rods 116 and also passes by centrifugal force into backing plate 121 oiling the ball bearing 120 and the roller bearing 119. With the arrangements of oil passages and ducts provided it will be seen that lubricating fluid is fed from the central passage 35 under pressure and with the aid of centrifugal force outward through the trunnions of the universal joint between shaft 109 and plate 118 into the ball and socket connections for the piston rods 116 and over the bearings 119 and 120 keeping these parts properly lubricated at all times. In order to permit free rotation of plate 118 together with the connected parts at various angular positions with relation to tail shaft 109, sufficient clearance is provided to permit a sliding motion of the collar members 130 on trunnions 126 and 128 sufficient to compensate for the irregularities of motion of the collar members on the trunnions due to the maintenance of a fixed center of universal motion at the intersection of the trunnion axes while the angular relation of the backing plate 121 and the supported parts is varied with relation to the shaft 109.

The central drive member 129 is slidably splined to and rotates with the shaft 109, and the parts are preferably so positioned when in assembled relation that the forward end of driving member 129 abuts against projections 137 of the coupling member 95. Backing plate 121 has formed integrally therewith a pair of trunnions 138 which are supported by means of the ball bearings 139 in straps 140 detachably mounted on an end cap 141. End cap 141 is detachably secured by means of the cap screws or studs 142 to the end of the casing 1. A collar 143 is provided on the tail shaft section 109 which abuts against roller bearing 144 in which the shaft 109 is supported. Bearing 144 is supported in the end of the cap 141 and is secured in position by a plate 145. A coupling member 146 adapted to connect the tail shaft section to the mechanism to be driven is secured to the end of shaft 109 which projects beyond the bearing 144 and a suitable packing gland 147 is provided to prevent leakage of the oil or fluid past member 146. To provide for lubrication of the bearing 144 a conduit 148 is drilled through shaft 109 to the end of the lubricating conduit 35. A pocket or sump 149 is provided in the casing 1 in which a pre-determined level of oil is kept and is used for supplying any leakage from the transmission circulating system and for lubricating parts. A gear pump 150 driven by means of the spindle 151 from the pinion 152 and a gear 153 secured to shaft 109 draws the excess fluid from the pocket or sump 149 and forces it outward through conduit 154 to the discharge pipe 155. The oil from pipe 155 is preferably passed through a suitable filtering arrangement, a portion is returned to the storage tank 50 through the conduits 156 (Figure 4), and a portion is forced through conduit 42 to the central lubricating passage 35. With the parts disposed in cap 141 as shown it will be noted that the backing plate together with the motor pistons and piston rods and tail shaft section 109 are removable as a unit with the cap 141. While the angular position of backing plate 121 may be manually controlled in obvious manner, an automatic control arrangement is preferably provided. Secured to ears or projections of the backing plate 121 by means of the pin 157' (Figure 2) is one end of piston rod 157, the opposite end of which is secured by means of a ball and socket connection 158 to piston 159. Piston 159 is supported in cylinder 160 and is provided with a tubular extension 161 which fits slidably in the projecting tubular member 162 of cylinder 160. A spring 163 interposed between the piston 159 and the end wall of the cylinder 160 normally urges piston 159 to the right (Figure 2) and tends to shift backing plate 121 to vertical position. It will be noted that the effective areas of piston 159 on opposite sides thereof are substantially different, producing in effect a differential piston arrangement. Fluid is admitted to opposite sides of the piston 159 through suitable supply ports 164, 165 and 165' (Figures 2, 9 and 10) which communicate with a control valve casing 166 (Figures 9 and 10) in which the valve member 167 is slidably supported. Valve casing 166 is provided with a removable end cap 168 against a projection of which the end of valve member 167 is held by means of a helical spring 169 seated in a recess of the valve member 167 abutting against a compression adjusting member 170. The compression adjusting member 170 is formed integrally on the end of rotatable spindle 171 which in turn is provided with the threaded section 172 fitting into a corresponding threaded portion of an end cap 173 threaded into the opposite end of the valve casing 166. A suitable cap 174 threaded on the end of casing 166 and provided with the packing gland 175 slidably and rotatably supports spindle 171. An arm 176 is splined to the projecting end of spindle 171. As arm 176 is actuated, spindle 171 will be rotated and will shift endwise with the member 170 varying the tension of the spring 169. A conduit 177 permanently connects the port 164 to the high pressure chamber or side of the fluid circulating system, and the conduit 178 connects the ports 165 and 165′ through the opposite end of valve 167 to the low pressure side of the fluid circulating system.

It will be noted that high pressure fluid is normally maintained on the left side of piston 159 in Figure 2 and the opposite or right end of cylinder 160 is normally in communication with the low pressure fluid. The parts are so proportioned and arranged that when the prime mover develops its maximum torque and the fluid pressure in conduit 177 is at maximum, valve 167 will be shifted in the casing 166 so that port 165 will be uncovered and port 165′ will be closed cutting off the right end of cylinder 160 from the low pressure conduit 178 and connecting it to the high pressure conduit 177. As the area of piston 159 on the right end is substantially greater than the area on the left space, the piston 159 will be shifted to the left in Figure 2 increasing the angle of backing plate 121 and increasing the torque ratio of the system and decreasing the torque demand on the prime mover. As the ratio of transmission reaches the value where the load on the tail shaft can be handled by the prime mover, the fluid pressures are reduced and valve 167 will shift under the influence of spring 169 until ports 165 and 165′ are both closed, locking fluid on both sides of piston 159 in the cylinder 160 and accordingly holding the backing plate 121 rigidly in position. As the load on the tail shaft decreases, the pressure in conduit 177 will drop further, permitting spring 169 to shift valve 167 and to connect port 165′ with the low pressure side of the system through conduit 178. The pressure of the fluid passing through port 164 will now be sufficient to over balance the pressure on the right of piston 159 (Figure 2) and the piston 159 will then be shifted to the right, turning the backing plate 121 toward its vertical position, and affecting a corresponding reduction in the transmission ratio until the driving torque approaches its maximum value. In this way it will be seen that the angle of backing plate 121 will be automatically varied to maintain the transmission ratio at a value where the torque developed by the prime mover will not exceed values predetermined by the compression of spring 169 and will be maintained at predetermined values under operating conditions effecting a maximum efficiency of driving relation in the system.

The means for varying the compression of the spring 169 has been provided for use when the prime mover or the transmission unit is an internal combustion engine and is to compensate for the variations in torque developed by engines of this type when cold and when warm after an initial period of operation. It will accordingly be understood that when the transmission is used with prime movers in which the torque developed does not depend upon permitting warming up or initial period of running, the means for varying the position of the member 170 may be eliminated and the compression of spring 169 may be set at a fixed value. When used with an internal combustion engine, the position of arm 176 may be varied with the throttle movement so that when the engine is idling the compression of spring 169 is reduced to a minimum, and as the throttle is opened up and the torque developed by the engine is increased, the compression of spring 169 is increased varying the amount of pressure necessary in the fluid delivered from conduit 177 to shift valve 167 in accordance with variations in the maximum torque deliverable by the prime mover. When starting such an engine cold, the arm 176 preferably is so positioned that the tension of spring 169 is reduced to a minimum and remains there even when the engine is accelerated and hence the transmission will be shifted automatically into low gear position at substantially lower fluid pressures than those that would obtain had the compression of the spring been increased in the normal manner along with the throttle acceleration. As a result of this arrangement the engine may handle the load during its warming-up operation without doing away with the automatic control mechanism.

A proper balancing of the motor unit is an essential feature for operation of my improved arrangement for practical operation. I have discovered that it is possible to so proportion the port areas 87 and 88 in the pump housing 9, the port areas 92 in the motor cylinders, and the valve face area of the motor unit that in operation the cylinder block 93 is held up against the face 89 with sufficient pressure to maintain a seal against substantial leakage of fluid into the casing 1, and without developing excessive bearing pressures on the valve face 89. This is accomplished by proportioning the relative areas of the ports and surfaces so that the pressure of the fluid tending to separate the cylinder block 93 from the valve face 89 is slightly less than the end thrust of the cylinder block 93 due to the fluid pressures in the cylinders to permit just sufficient over-balance of the end thrust to be developed on the valve face by the motor cylinder block to maintain a seal against substantial fluid leakage outward. In this way excessive wear at the valve faces is avoided in operation and the life and efficiency of the unit are substantially increased. The proper proportions for balancing the motor unit may be approximately calculated for each particular type of motor but are best established by experimentation, and the balance is preferably so proportioned that a film of fluid may be maintained on the face 89 in operation through which the pressure works outward gradually decreasing to zero at the outer edge of the face 89. In prior transmissions utilizing parallel cylinder motors, in order to prevent the delivery of an impulse to the tail shaft it has been the practice to stagger the cylinders and to space them unevenly. By providing motor arrangement disclosed with the special universal joint compensating for angularity of the backing plate 121, and an odd number of cylinders, preferably nine or more, the impulse in the tail shaft is substantially eliminated, the elimination of the impulse being aided by the uniform reactance of the pump element on the tail shaft. It will accordingly be seen that a simplified and improved parallel cylinder construction for use in hydraulic transmissions is provided, the many advantages of which will be apparent to those skilled in the art.

In operation of the system when the tail shaft 109 is stationary a maximum pumping of fluid occurs which is delivered from the high pressure chamber 45 through port 88 to the motor cylinders 91. The fluid pressure on the pistons 115 is transmitted through piston rods 116 to the plate 118 causing rotation of the plate 118, trunnions 126 and 128, driving member 129, shaft 109, coupling member 95, cylinder block 93, and shaft section 32. The maximum driving torque is exerted in well known manner by the motor unit on the tail shaft 109, when backing plate 121 is at its maximum angle. As the speed of tail shaft sections 109 and 32 increases, the fluid pumped by the pumping elements decreases and the angle plate 121 is shifted to correspondingly decrease the volumetric displacement of the motor unit. When the angle plate reaches vertical position the driving shaft and tail shaft sections will be rotated at substantially the same speed and the volumetric capacity of the pump is reduced to substantially zero. In this position of parts, the fluid does not circulate and all of the power is transmitted through the pumping elements independently of the motor unit. As the angle of the backing plate 121 is increased the amount of power transmitted directly through the pumping elements and the speed of the tail shaft decreases, while the torque delivered at the tail shaft increases due to the diversion of part of the power through the hydraulic system to the motor unit. The general operation of this type of system is well known and a more detailed description thereof need accordingly not be here given.

When the torque demand on tail shaft 109 is less than the torque deliverable by the prime mover, the automatic control will shift backing plate 121 into vertical position as above set forth, no circulation of fluid between the pump and motor can take place and the driving and tail shafts will rotate at the same speed. In ordinary operation of motor vehicles, the backing plate will be in vertical position for the greater portion of the time and it is desirable to provide means for relieving the pressure on the motor unit in these periods. This may be accomplished by closing the locking valve 71 and locking the fluid in the high pressure chamber 45 and spring 163 will hold plate 121 in vertical position. While the closing of valve 71 may be accomplished manually, an automatic control is preferably provided, one form of which comprises a control valve arrangement disposed in the head 179 of the cylinder 160. Formed integrally with the head 179 is a control valve casing 180 provided with a valve seat 181 in which the valve member 182 is slidably seated. Valve member 182 is provided with a projection 183 which extends through an opening in the head 179 into the cylinder 160 and is adapted to be engaged and shifted to the right in Figures 2 and 9 by piston 159 as it reaches the end of its movement in shifting backing plate 121 to vertical position. Valve member 182 is held to the left in Figure 9 by a compression spring 184 seated in a recess formed in the end of the valve member and abutting against the removable end cap 185. A conduit 186 drilled through the valve member 182 permits fluid from the cylinder 160 to pass into the end of the valve chamber so that the fluid pressures are balanced at opposite ends of the valve member 182 and the fluid provides a seal against the admission of air into the cylinder 160. Port 189 is provided in the valve casing 180 to which fluid under pressure, preferably compressed air, is admitted from the pipe 189a and exhaust outlets 187 are arranged equal distances on either side of port 189. Outlets 190 and 191 are connected to the conduits 86 and 85 of the valve operating cylinder 82. With the valve member 182 in the position shown in Figure 9 and fluid pressure in conduit 189a, the fluid will pass through port 189 and port 190 to conduit 85, and will shift or hold the piston 80 (Figure 4) to the right holding valve 71 in open position. When the backing plate approaches its vertical position, piston 159 will shift valve member 182 against the tension of the spring 184 to the right in Figure 9 and the conduit 86 will be connected to the pressure port 189 while conduit 85 will be in communication with the exhaust ports 187. Admission of pressure to the conduit 86 will force piston 80 to the left in Figure 4 and will close valve 71 locking the pressure in the chamber 45. With the parts in this position, if the torque required at the tail shaft increases and the operator seese that his prime mover cannot handle the load in direct couple, fluid pressure is connected to exhaust conduit 187a and the conduit 189 is connected to the low pressure or exhaust side of the control fluid supply. This will result in high pressure being connected to the conduit 85 and low pressure to conduit 86 and will force piston 80 to the right in Figure 4 causing opening of valve 71 and fluid pressure will then pass from the pump chamber 45 to the motor unit. The hydraulic system will now become effective and automatic control will position the backing plate 121 in accordance with the torque requirement, and the transmission of power will proceed through the hydraulic system as above set forth.

It will be noted that the actuation of the hydraulic lock to remove pressure from the motor unit is effected automatically and it is impossible for an operator to close the locking valve 71, the opening of the valve being entirely under manual control and the closing being entirely automatic. This method of control is an essential feature of my invention for efficient operation of the device.

Instead of the automatic control of the angle plate 121 in the form of invention shown in Figures 1 to 10, a control may be provided for example, as shown in my co-pending application Serial Number 58,806, which will permit shifting of the angle plate 121 beyond its vertical position so that it will be inclined to the vertical on an angle opposite to that shown in Figure 2. As is well understood in the art, shifting the angle plate 121 in this manner will cause a rotation of the tail shaft 109 together with the connected parts in opposite direction from the rotation of the driving shaft 15. When this occurs, the reaction of the pump elements on the tail shaft section 32 will oppose the rotation of the tail shaft, resulting in a reduction in torque ratio over that secured when the transmission is running in a forward direction with the backing plate at an equal inclination. In cases where it is desired to reverse the transmission in this manner, the construction of parts may be modified to permit a disconnection of the tail shaft from the pumping element and an anchoring of the pump elements which ordinarily rotate with the tail shaft to the stationary casing so that in reverse the unit becomes a combination of a fixed capacity pump and variable motor. Aside from the provision of a suitable control of the backing plate 121 which may be a manually operated control as shown in my co-pending application Serial Number 58,806, filed September 26, 1925, an arrangement for effecting this type of operation is shown in Figure 11. The parts shown in Figure 11 are arranged so that they may be substituted for the parts shown between lines A—A and E—E of Figure 2. Similar parts shown in Figures 2 and 11 have been given like reference characters and only the changed parts and so much of the similar parts as will be necessary to an understanding of the modification disclosed in Figure 11, will be herein set forth. Inserts 48 against which the surface 47 of the pump element 31 abuts is provided with securing flanges and is rigidly secured against turning by means of securing studs or cap screws 191 to the wall 49 of the pump housing section 9. An internally toothed ring 192 is secured to and rigidly supported from the insert or ring 48 by means of the supporting ribs 193. A splined section 194 is formed on the shaft section 32 upon which a dogging member 195 is slidably supported. At its forward end, the dogging member 195 is provided with teeth 196 which are adapted to mesh with the internal teeth formed on ring 192. At its opposite end dogging member 195 is provided with teeth 197 which mesh with suitable clutch teeth formed in the left end face of the coupling member 95. Formed on member 195 is an annular ring or channel 198 in which the lower end of an actuating arm or member 199 slidably fits. Actuating member 199 is supported by means of a ball and socket connection 200 in the housing section 9 adjacent the valve 51 for admission of fluid to the low pressure chamber 46. The upper end of the arm 199 projects into the storage space 50 and is connected to a suitable actuating link 201 which in turn extends through and is slidably supported in casing 1.

Formed integrally with the splined section 194 of shaft section 32 is a supporting and pilot extension 202 which is journalled in a suitable metallic bushing 203 supported in the end of a coupling member 95. Coupling member 95 is extended as shown, and is journalled in ball bearing 204 which replaces the ball bearing 97 shown in Figure 2. Ball bearing 204 is seated in the end of the housing section 9 and is held in position by means of the end cap 205 and the threaded collar 206. To prevent leakage of oil from the low pressure chamber 46 through the roller bearing 204 suitable packing gland structure 207 is provided in the cap 205.

With the parts in the position shown in Figure 11, the reaction on shaft 32 due to the pumping action when power is being transmitted through the fluid will be transmitted through the splined section 194, dogging member 195, teeth 197, coupling member 95, and the splined tail shaft section 111 to the tail shaft aiding the driving action on the tail shaft when the tail shaft and driving shaft are rotating in the same direction. When it is desired to reverse the rotation of the tail shaft by shifting the backing plate 121 to the opposite side of its vertical position as shown in Figure 2, the rod 201 is actuated to shift the lower end of arm 199 together with the dogging member 195 to the left in Figure 11 until teeth 196 mesh with the teeth of ring 192. Coupling member 95 will then be disconnected from the tail shaft section 32 and shaft section 32 together with the connected pump parts will be held stationary with the housing section 9. With the parts locked in this position, it will be noted that the reactance of the pumping element is not transmitted to the tail shaft and the motor does not have to overcome the reactance in the pump with the result that a more effective reverse will be obtained. If desired shaft section 32 may be permanently anchored to housing section 9, and in this case a transmission of the type will be provided in which in direct gear or when the tail shaft is in higher speed a maximum pumping of the fluid will occur in the system.

Figure 12:
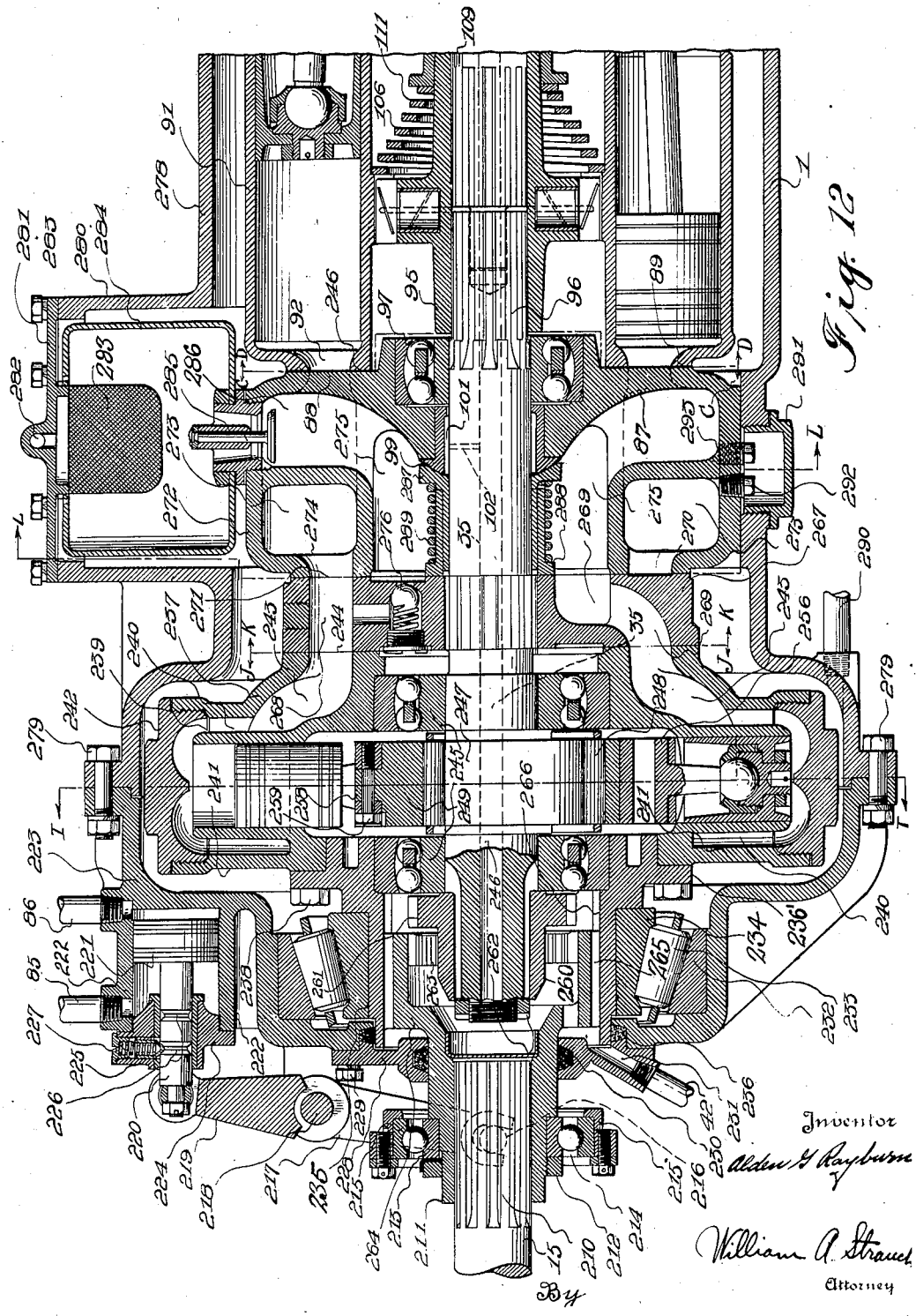
Figure 12 is a longitudinal section showing the essential parts of a modified form of the invention.

In the form of invention shown in Figure 12, I have shown a modification of the valving and pump arrangement, permitting a novel type of plunger pump to be utilized in place of the gear pump unit shown in Figures 1 and 2. In this form of invention the motor unit and controls therefor are the same as shown in connection with Figures 1 to 10, but a mechanical lock for coupling the driving shaft 15 and the driven shaft or tail shaft 109 together in direct gear is provided. In this form of the invention, the driving shaft section 15 is provided with a splined section 210 upon which the splined coupling member 211 is slidably mounted. Secured on the connecting member 211 by means of the threaded collar 212 is inner race 213 of a ball bearing 214. The outer race 215 of bearing 214 is supported by a shifting collar member 215 provided on opposite sides with actuating extensions 216. Extensions 216 of collar 215 fit slidably into the bifurcated lower ends of the actuating arms 217 which are pivotally mounted on spindle 218 suitably supported from the casing and actuated by arm 219. The upper end of the arm 219 is connected to the outer end of a piston rod 220 which is actuated by a piston 221. Piston 221 is mounted in a suitable cylinder 222, preferably formed integrally with a casing end section 223. Mounted in the head 224 of the cylinder 222 is a locating and locking device 225 with a substantially V-shaped end urged into V-shaped annular grooves 226 formed in the piston rod 220 by means of a spring 227. The locking device 225 functions in obvious manner to lock the piston rod 220 together with the dogging or connecting member 211 against inadvertent movement from the positions determined by the end positions of movement of the piston 221. Operating fluid for the piston 221 is supplied through conduits 85 and 86 under automatic control of the motor unit as will more fully hereinafter appear.

Figure 13:
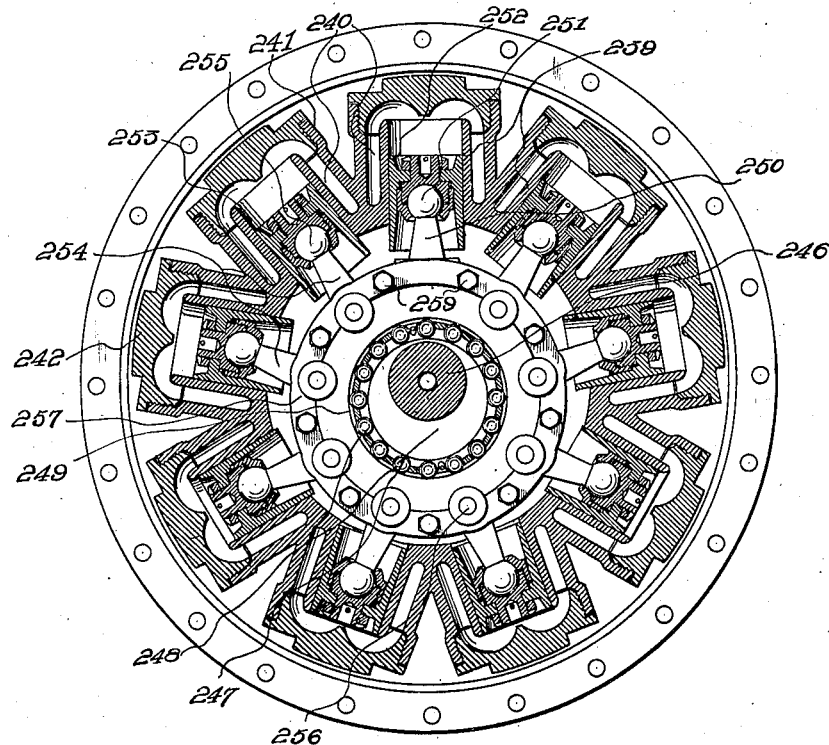
Figure 13 is a section taken along line I—I of Figures 12 and 17.
Figure 14:
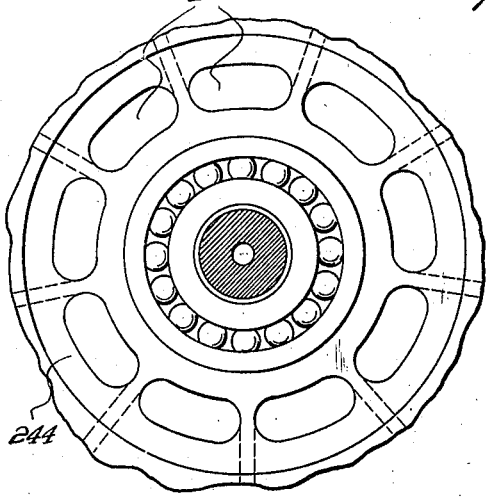
Figure 14 is a section taken along line J—J of Figures 12, 17 and 21.
Figure 15:
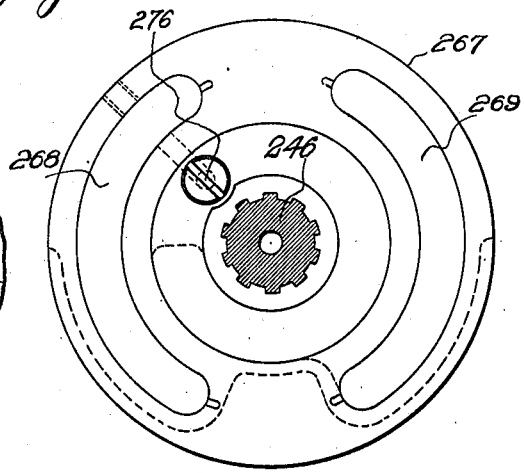
Figure 15 is a section taken along line K—K of Figures 12, 17, 18 and 21.

Casing 223 is provided with an end cap 228 secured thereto by means of the studs 229. Dogging member 211 extends through a central opening in cap 228 provided with suitable packing gland 230. A conduit 231 for admission of lubricating oil to the interior of the unit is formed in cap 228 and is supplied by oil under pressure from the pipe 42 which is supplied with oil under pressure from the gear pump 150 as described in connection with Figures 1 to 10. Supported in the casing section 223 is the outer race 232 of roller bearing 233, the inner race 234 of which is secured to and supports the pump driving sleeve member 235. At the left end of sleeve member 235 a packing member 236 is held in position by the cap 228 to prevent substantial leakage of the lubricating oil from the interior of the sleeve 235 to the interior of casing section 223. Formed integrally with the sleeve 235 is a flange 236' to which the cylinder block 237 is secured by means of the securing studs or bolts 238. Formed in the cylinder block 237 are the radial cylinders 239 (Figures 12 and 13) the outer ends of which are open and in communication with the spaces or chambers 240 formed between the outer cylindrical surfaces of the cylinders 239 and inner surfaces of encasing cylinders 241 formed integrally in the cylinder block 237. The outer ends of the cylinders 241 are closed by the caps or heads 242 threaded or otherwise detachably secured thereto and the interior surfaces of the heads 242 are provided with recessed sections forming communicating passages for fluid between the chambers or spaces 240 and the bores of the cylinders 239. The chambers 240 communicate with ports 243 individual thereto (Figures 12 and 14) which terminate in the valve face 244 on the end of the cylinder block 237. It will be noted that the sleeve member 235 and the cylinder block 237 are connected together as a unit and rotation of the sleeve member 235 will rotate the cylinder block 237 together with the cylinders carried thereby. Disposed in sleeve 235 and cylinder block 237 are the ball bearings 245 which in turn support the tail shaft section 246. Formed integrally with the tail shaft section 246 is an eccentric 247 upon which the rollers 248 of a roller bearing are supported. Supported on rollers 248 is a ring or collar member 249 to which is rigidly secured in any suitable manner a piston rod 250 (Figure 13) which is connected by means of a ball and socket connection 251 to an actuating and guiding piston 252 mounted for reciprocation in one of the cylinders 239. Mounted in the remaining cylinders 239 are reciprocating pistons 253 in which the ends of piston rods 254 are secured by means of the ball and socket connections 255. Formed integrally with the inner ends of the piston rods 254 are the cylindrical bearing members 256 preferably provided with central bores, and held in suitable cylindrical ring seats formed in the ring 249 by means of the securing collars 257 which in turn are secured to outwardly extending ears 258 (Figure 12) of the collar member 249 by means of the securing bolts or studs 259.

Secured on and slidably keyed to the left end of the shaft section 246 is a coupling member 260 provided with the driving teeth 261. Coupling member 260 is held on the end of shaft section 246 by means of the nut 262 and the teeth 261 are adapted to mesh with teeth 263 formed on the interior of extension 264 of the dogging member 211. Formed on the exterior of the extension 264 are the driving teeth or splines 265 which are in meshed slidable engagement with the teeth 266 formed on the interior of the pump driving sleeve 235.

Slidably splined to and rotatable with the tail shaft section 246 is a valve plate 267 in the left face of which the ports 268 and 269 communicating with the pump ports 243 are provided. The port 268 communicates with an annular opening 270 formed in the face 271 (Figures 12 and 16) of the stationary valve 272 and the annular opening 270 in turn communicates with an annular chamber 273 formed in the valve 272. Suitable strengthening ribs 274 are provided across the annular opening 270. Port 269 of valve plate 267 communicates with a central annular low pressure chamber 275 formed in the valve 272. A suitable valve 276 is provided in the valve plate 267 to admit fluid to the high pressure chamber 273.

Valve 272 is slidably supported on keys or tongues 277 (Figure 16) which in turn are securely supported in the casing section 278. Casing section 278 is secured at its left end to the casing section 223 by means of securing bolts 279 (Figure 12). Formed on the casing 278 is an extension 280 provided with a removable cover plate 281. A return conduit 282 for leakage fluid or oil used is formed in the cap 281 and secured centrally to the cap 281 is a filtering member 283 through which fluid discharged from conduit 282 must pass. Filtering member 283 extends downward into a storage tank 284 which is secured to and supported from the valve plate 272. An inlet check valve 285 is provided in the bottom of the storage tank 284 and provides a communicating passage between the storage tank 282 and the air trap space 286 which in turn communicates with the low pressure chamber 275 of the valve plate 272. It will be noted that the valve 272 together with the storage tank 284 is movable relatively with respect to the casing 278 but that the keys 277 prevent rotation of the valve 272. Conduit 282 is preferably connected to the pipe 155 of the gear pump 150 of the motor unit so that the leakage into the casing is returned to the storage tank 284.

Figure 6:
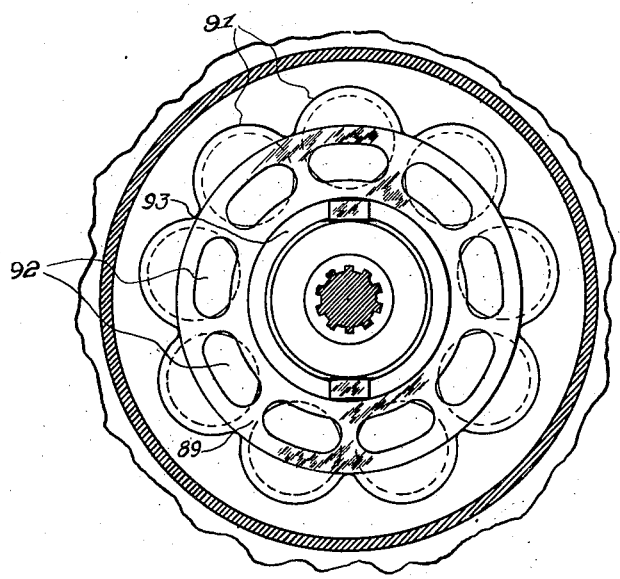
Figure 6 is a section taken along line D—D of Figures 1, 2, 12, 17, 19, 21 and 22.

Tail shaft section 246 extends through an insert 99 which corresponds to insert 99 shown in Figures 1 and 2 and terminates in splined section 96, corresponding to the splined section 96 of the tail shaft section 32 in Figures 1 and 2. The high pressure chamber 273 communicates through the port 88 shown in Figures 5 and 12 with the ports 92 of the motor cylinders 91 (Figure 6). The end face 89 of the valve 272 corresponds to the end face 89 of the pump housing section 9 shown in Figure 1 and the motor construction together with the automatic motor controls are the same as are shown and described in connection with Figures 1 to 10. To seal the low pressure chamber 275 against leakage the insert 99, in this form of invention, is provided with a spherical face, the center of curvature of which is at the center of motion of shaft section 246 in the bearing 97 which in this form of invention is of the self aligning type. A sealing sleeve member 287 provided with a recessed spherical surface adapted to fit the curved sealing surface of insert 99 is slidably mounted on the shaft 246 and a sealing sleeve 288 is slidably mounted on sleeve 287 while a spring 289 is interposed between the flanges of the sleeves and forces the end faces thereof into engagement respectively with the end face of the insert 99 and the end face of plate 267. Central lubricating conduit 35 is drilled through the tail shaft section 246 and lubricant under pressure from pipe 42 is forced into the interior of sleeve 235 lubricating the bearings 245 and 248, and the pump parts and at the same time is forced through the lubricating conduit 35 out of the duct 102, and into the motor parts as more fully set forth in Figures 1 to 10. The gear pump 150 may supply to conduit 42 and a conduit or pipe 290 may be provided to lead any excess fluid that may collect in the casing around the pump cylinders to the pocket or sump 149 to be returned to the circulating system in obvious manner. To provide for draining of the fluid from the system, a cap 291 is provided in the bottom of casing 278 giving access to drain plugs 292 and 293 through which fluid may be drained from the high and low pressure chambers 273 and 275 in the valve 272.

To provide for interconnection of the high and low pressure chambers 273 and 275, a clutch valve 65 (Figures 1, 4 and 16) is provided in the valve 272, the details of which are similar to and will be obvious from an inspection of the clutch valve 65 and the arrangement thereof shown in Figures 1 and 4. Clutch valve 65 in the present form of invention is preferably operated by a compressed air cylinder 81 and piston 80, in the manner set forth in connection with the operation of clutch valve 65 in the form of invention shown in Figures 1 to 10. With the piston 80 and connected parts in the position shown in Figure 16, the high and low pressure chambers 273 and 275 will be interconnected through the port 66 of the valve 65 and the transmission will be in neutral position. When compressed air is admitted to the pipe 84 by the operator, piston 80 will be shifted to the right in Figure 16 and will close the connection between the high and low pressure chambers forcing the fluid under pressure from the pump to pass to the motor and to transmit the power through the hydraulic system to the tail shaft.

It will be noted that the construction and arrangement of parts in the pump unit is such that the valve plate 267 is in fixed relation to the eccentric 247 with a greater part of its mass on the side of shaft 246 opposite the greatest mass of the eccentric 247. The relative position of the eccentric 247 governs the stroke of the pistons, and with the arrangement of parts disclosed, the mass of the valve plate 267 may be so proportioned and arranged that it will in operation counterbalance the unbalanced weight of the pistons and eccentric, producing a balanced radial cylinder pumping unit which may be operated at high speeds. This arrangement of parts for producing a balanced pump unit is an important feature of my invention.

Further important features of my invention are the improved methods of maintaining seals by utilizing sealing members held in position by the pressure of the fluid. These sealing members are of especial advantage and novel because of the principle of sealing involved. The sleeve of the sealing member is caused to make a close fit on the shaft and is of a length to prevent low pressure leakage. The spring causing the sleeve to slide on the shaft until the end of the sleeve which terminates in a finished face or surface comes in running contact with the stationary sealing surface. It can readily be seen that due to the end sealing surface which takes the speed of rotation between the revolving shaft and the stationary valve member, being of small area, very little friction will result and at the same time full sealing value is obtained and wear on the surface is automatically taken up. The long sleeve fit around the shaft due to its close fit and the necessity of only sliding longitudinally is thereby able to keep the fluid from leaking between the shaft and the sleeve without causing any friction or wear due to its part in maintaining the seal. This is an important part of my invention and is necessary to minimize wear and unnecessary friction and leakage of fluid from the system. It will in particular be noted that by providing the self aligning bearing 97 for the shaft section 246, and the sealing member 287 with its spherical seat, together with the connection permitting universal movement between the motor cylinder block 93 and coupling member 95, an effective arrangement is provided in which the parts will align and maintain themselves in sealing relation under operating conditions.

In operation of this form of invention, rotation of the driving shaft section 15 causes rotation of the dogging member 211 which in turn drives the sleeve 235 through the teeth 265. Rotation of sleeve 235 drives cylinder block 237 which in turn causes rotation of the pistons 252 and 253 together with the collar member 249 about eccentric 247, causing reciprocation of the pistons. As the pistons move inward fluid is drawn from the low pressure chamber 275 through the low pressure port 269, ports 243 in register with the low pressure timing port 269 and chambers 240 into the cylinders 239. As the cylinders are rotated until their respective ports 243 come into communication with the port 268 the pistons travel outward forcing the fluid from cylinders 239 into chambers 240, through ports 243 and 268 into the high pressure chamber 273 of the valve 272. Fluid under pressure is forced through port 88 into cylinder ports 92 of the motor cylinders 91 causing rotation of the motor and driving of the tail shaft. As the ports 92 of the cylinders pass into communication with the port 87 of the valve plate, fluid is discharged from the motor cylinders into low pressure chamber 275 of the valve plate in obvious manner. As the motor starts the tail shaft 109 and shaft section 246 into rotation, the relative speed of the cylinders with relation to the eccentric 247 is decreased until when the tail shaft is rotating at the same speed as the driving shaft 15 no pumping action will occur. As hereinbefore described under these conditions the automatic control of the motor will bring the backing plate 121 into the vertical position shown in Figure 1 and piston 159 will actuate valve 182 (Figure 9) to connect pipe 86 to the high pressure operating fluid and pipe 85 is connected to the exhaust side. This will result in a movement of piston 221 to the left in Figure 12 as the driving and tail shafts reach the same speed and the dogging member 211 will be shifted to the right forcing teeth 263 into engagement with the driving teeth 261 of the shaft coupling member 260. The parts will be then locked in direct mechanical driving relation from the driving shaft 15 to the tail shaft 109, and the pump and motor units will be relieved of the hydraulic operating pressures.

As set forth in connection with Figures 1 to 10, when it is noted by the operator that the torque demands at the tail shaft are approaching values greater than the torque deliverable by the prime mover, the operator moves a valve which connects pipe 85 to the high pressure operating fluid and pipe 86 is connected to the exhaust, resulting in a shifting of the piston 221 to the right in Figure 12 and movement of the dogging member 211 to the left. This disconnects the mechanical connection between the driving shaft and the tail shaft and the pressures in the hydraulic circulating system will rise. The automatic control will then shift the backing plate to its proper position so that the torque demands on the prime mover are reduced, in the manner hereinbefore set forth. It is to be noted that in this form of the invention, longitudinal reaction of the motor cylinder block 93 is transmitted through valve plates 272 and 267, and through the pump cylinder block 237 to the thrust bearing 233. In this way pressure is at all times maintained on the valve faces in fluid pressure balanced relation tending to maintain them in sealing relation and to compensate for any wear that may take place in the system. This constitutes an important feature of my invention and considerably simplifies the problem of maintaining effective seals under continuous operation of the system.

When the tail shaft becomes the driving member, as frequently occurs in motor vehicle drives, pressures will build up in the low pressure chamber 275 tending to close valve 285 and to cut off fluid from the tank 284. When this occurs valve 276 will unseat, admitting fluid through port 268 to the chamber 273 which under these conditions becomes the low pressure chamber. Opening of the valve 276 in this way lowers the pressure in chamber 275 and permits valve 285 to open, maintaining the fluid supply in the circulating system.

To eliminate the necessity for making the valve 272 slidable with relation to the case 278, the form of invention shown in Figures 12 to 16 may be modified as shown in horizontal section Figure 17. In this form of the invention the valve 272' is formed integrally with a housing or extension 294 which is provided with a flange 295 rigidly secured between the casing sections 278 and 223 by the bolts 296. The opposite end of the valve body 272' is supported in a suitable projection 297 of the case 278. It will be understood that the horizontal sectional view shown in Figure 17 has been distorted to show the changed valve arrangement and the clutch valve 65 in the valve body 272', and that a storage supply tank and arrangement similar to that shown in Figure 2 is provided which communicates with the low pressure chamber 275 of the valve body 272' in a manner which will be obvious to those skilled in the art. While the form of tank utilized in Figures 12 to 16 may be used, it will also be noted that a storage space 298 around the valve body 272' and the housing extension 294 thereof is provided which is similar to the storage space 50 surrounding the housing section 9 of the form of invention shown in Figures 1 to 10, and this space may be utilized for storing of the fluid supply in connection with an arrangement similar to the storage tank arrangement in Figures 1 to 10 in obvious manner. The space 298 may also be utilized as a cooling space through which cooling fluid is circulated from a pipe 299 and an outlet pipe not shown. For cooling purposes, the casing section 223 may also be provided with the jacket spaces 300 which may be connected to a suitable cooling system as for example, the cooling system of an internal combustion engine in obvious manner. Valve plate 267' which rotates with the tail shaft section 246 as set forth in connection with Figure 12, is modified so that the port 268 thereof communicates with the space formed within the housing section 294 comprising a continuation of the high pressure chamber 273. The pump elements not specifically described are the same as set forth in connection with Figures 12 to 16 to which a reference may be had for a full understanding thereof.

It will be noted that fluid under pressure is discharged through ports 268 into the high pressure chamber or space which in this form of the invention completely surrounds the pump. To prevent so far as possible whipping of the fluid in the high pressure chamber the projecting ends of the cylinders 241 and the caps 242 are covered by a casing 301 to present smooth rotating surfaces. To prevent collapsing of the casing 301, holes may be drilled therein to permit entry of fluid under pressure within the spaces formed between the cylinder block and the casing. In this form of the invention the surfaces and areas of the pumping units are so proportioned and balanced that a sufficient over-balance of pressure urging the pumping parts to the right (Figure 17) is maintained in operation to hold the valve face 244 of the cylinder block against valve plate 267' with sufficient pressure to maintain a sealing action without permitting excessive bearing pressures to develop on the face 244. Because of the balance established in this manner, and the anchoring of valve body 272' against endwise movement with relation to the case 278 in this form of invention, any end thrust of cylinders 241 on the casing section 223 is relieved and the necessity for providing a heavy thrust bearing such as shown at 233 (Figure 12) is eliminated. An ordinary roller bearing 302 of standard construction is accordingly substituted therefor. As high pressure fluid will be forced in and around the bearing 302 and a sealing sleeve 303, the pressure in the chamber 273 is relied upon to hold the pumping unit in sealing relation against the valve plate 267' and valve body 272'. The sealing sleeve 303 is slidably supported on the sleeve 235 and a heavy helical spring 304 is interposed between the bearing 302 and a shoulder on the sealing sleeve 303 and forces the end of sealing sleeve 303 into sealing engagement with a suitable face on the end cap 228.

It will be understood that the clutch valve 65 is operated by a mechanism shown in Figures 4 and 16. With the valve 65 in the position shown in Figure 17, high and low pressure chambers are inter-connected and the transmission is in neutral. To start the tail shaft in operation, valve 65 is closed and pressures will then build up causing the fluid to pass through high pressure port 88 to the motor cylinders 91. The functioning of the parts is the same as set forth in connection with the forms heretofore given and a full understanding will be had by reference to the description given in connection with Figures 12 to 16.

In operation of hydraulic transmissions of the character heretofore set forth, it is frequently desirable to operate auxiliary apparatus by fluid pressure. The present type of transmissions are admirably adapted for withdrawal of fluid from the high pressure chamber 273 of the system without interfering with the operation of the transmission and without causing trouble due to the formation of air which frequently is entrained in fluid operating various types of auxiliary apparatus, such as for example, dump bodies on motor vehicles, cranes, brakes, jacks, and similar devices. To provide for the operation of such auxiliary apparatus, a connection 305 passing through a suitable stuffing box 306 is made to the high pressure side of the system. From the outer end of the connection 305 the fluid may be led by suitable coupling members or conduits to the mechanism to be operated, and after passing through the mechanism, the fluid is returned through the conduit 282 (Figure 12) and filtering device 283 to the storage tank 284 or through pipe 299 when the space 298 is used for storage of fluid. This operation is rendered feasible by the provision of the arrangement for permitting air entrained in the fluid to settle out of the system in the storage tank and may be applied to any one of the forms of my invention.

In the form of invention shown in Figure 17, provision is made for mechanical dogging of the driving shaft and the tail shaft sections when the prime mover is capable of meeting the torque demands at the tail shaft directly, and the tail shaft speed is equal to the speed of the driving shaft. In Figure 18 a modified arrangement of parts to be substituted for the parts shown in Figure 17 between the line N—N and N'—N' is shown, in which the locking valve 71' for locking the fluid pressure in the high pressure chamber 273 when direct transmission is desired is provided, the mechanical dogging arrangement shown in Figure 17 is eliminated and means are provided for reversing the high and low pressure chambers to reverse the direction of rotation of the tail shaft. In this form of invention valve 71' is positioned to cut off the flow of fluid from the high pressure chamber 273 to the high pressure port 88 of the valve body 272'' in the manner set forth in connection with the valve arrangement 71 shown in Figures 1 and 2. The valves 65 and 71' may be under manual control or, obviously, may be actuated by fluid pressure responsive mechanism somewhat similar to that described above in connection with the other forms of apparatus. With valve 71' in the position shown in Figure 18, fluid under pressure is admitted through port 74' to the auxiliary operating system through connection 305. When the automatic control of the motor brings the backing plate to vertical position and the tail shaft is rotating the same as the driving shaft, piston 80 will actuate the valve 71' to lock the fluid in the high pressure chamber 273 preventing relative movement of the pumping element and causing transmission of all of the power directly through the pumping element to the tail shaft. At the same time the low pressure chamber 275 will be connected to the high pressure port 88 of the motor through the passages 73 and 74'.

To provide for reversing this form of the invention, the clutch valve 65 is provided with a port 306' and the fluid passes are so arranged that with the valves in the position shown, fluid from the high pressure chamber 273 will pass through port 72' of valve 71' to the port 87 of valve body 272'', while port 88 will be connected through the port 306' to the low pressure chamber 275. When it is desired to change the direction of the tail shaft rotation valve 65 is shifted counter clockwise 90 degrees from the position shown, connecting the high pressure chamber directly to port 88 through the passage 66, and valve 71' is turned counter clockwise 90 degrees from the position shown connecting port 87, passages 74' and 72' of valve 71' to the low pressure chamber 275. To interconnect the high and low pressure ports and place the transmission in neutral position valve 65 alone, valve 71' alone, or both valves 65 and 71' may be rotated clockwise 90 degrees from the positions shown. It will accordingly be noted that valves 65 and 71' may be operated to hydraulically lock the pump parts for direct transmission, to reverse the rotation of the tail shaft and to interconnect the high and low pressure sides of the system to obtain neutral. A further feature of the valve constructions utilized is that large areas of fluid passes through the valves may be provided, a highly important result not heretofore obtainable in the various valve controls proposed for hydraulic transmissions of the type herein set forth.

In hydraulic systems of the type herein disclosed the maximum torque multiplication obtainable is predetermined by the design and proportions of the parts. With pressures in the fluid systems ranging up to about 500 pounds per square inch and powers ranging upward of 300 horse power units, the physical limitations on the apparatus make a torque multiplication of ten to one about the maximum that may be practically obtained and by setting a maximum torque multiplication ratio at about 5 to 1 in the entire system with pressures of 500 pounds to the square inch, a commercial transmission of 300 horsepower or more is easily within the limits of practical construction in proportion and sizes of parts. However, it is frequently desirable to secure a much higher ratio than from 5 to 10 to 1 in torque multiplication, especially in internal combustion engine driven locomotives in which maximum torque demands may be relatively infrequent and made for short intervals only, because as the load starts into movement, the torque demands on the tail shaft decrease. Under conditions of this character where large torque multiplications are desired for relatively short times, it is feasible to increase the operating pressures in the fluid system considerably to get the increased or overload torque required, and as the torque demands decrease, the pressures in the system may be dropped correspondingly so that the losses due to the use of high pressure become negligible. In this way it is feasible to increase the normal maximum torque ratio from 5 or 10 to 1 to 30 or 40 to 1 if desired for handling overload torque, without utilizing mechanisms of prohibitive dimensions for the transmission of heavy powers. For short intervals of time, my improved transmissions may operate at 1500 pounds per square inch or more without serious losses, raising the pressures from normal maximum operating pressures of from 300 to 500 pounds per square inch. This is accomplished by providing means, preferably but not necessarily, automatic in nature for increasing the pressure and decreasing the volume delivered by the pump. In Figure 19 I have shown a modified arrangement of this character suitable for application to locomotive and similar heavy duty transmissions. In this form of invention, the motor unit and stationary valve plate arrangement together with the storage tank arrangement, is exactly the same as shown and described in connection with Figure 12 as will be seen from an inspection of parts marked with similar reference characters. The rotatable valve plate 267'' is, however, provided with a central extension 307 and is slidably splined on the end of the tail shaft section 246. To prevent leakage of fluid around extension 307 and past insert 99, a sealing sleeve 308 is slidably supported on extension 307 and has the end face thereof held in engagement with insert 99 by helical spring 309. The valve plate 267 is splined or bolted at 310 to a cylindrical pump casing section 311 which has formed integrally therewith a securing flange 312 to which is rigidly secured the flange 313 of the casing section 314 by means of securing bolts 315. Formed integrally with the section 314 is a tubular extension or sleeve 316 which is supported for rotation in a ball bearing 317, in turn supported from the stationary casing section 318. Casing section 318 is secured to the stationary casing section 278 in any suitable manner. Secured to the end of casing 318 by means of the securing studs 319 is an end cap 320 provided with a suitable packing gland 321 through which a tubular extension of the driving member 322 extends. Driving member 322 is slidably splined on the end of the driving shaft section 323 and is prevented from inadvertent end-wise movement by the securing nut 324. Splined to shaft 323 is a driving member 325 on which the driving teeth 326 are integrally formed. Slidably splined to the tubular extension 316 of the casing 314 is a dogging or coupling member 327 provided with internal driving teeth 328 which are adapted to mesh with teeth 326 on the coupling member 325 when the dogging member 327 is shifted to the right in Figure 19. A suitable actuating collar 329 provided with the trunnions 330 may be actuated by arms 331 in any suitable manner to shift the member 327 to the right in Figure 19 providing a direct mechanical coupling between the driving member 322 and the tail shaft section 246 through sleeve 316, casing sections 314 and 311, and valve plate 267''. Formed integrally with the driving shaft section 323 is a splined section 333 and a pilot or bearing section 334 which is supported in a ball bearig 335 in turn supported in the valve plate 267''. Slidably splined to the section 333 of the driving shaft section 323 are the coupling members 95 and the central universal driving connection 129 of a variable stroke piston pump unit. The pump unit comprises a rotatable cylinder block with parallel cylinders, a rotatable driving plate, and a variable backing plate to vary the stroke of the pump pistons. The details of construction of the pump, with the exception of size of parts, are exact duplicates of the corresponding parts of the parallel cylinder motor unit shown in Figures 1 to 10. Inasmuch as the parts are duplicates of the motor parts, the only difference being that the plate 118 is driven by rotation of the central drive member 129 of the universal joint to reciprocate the pump pistons. The reference characters applied to similar motor parts in Figures 1 to 10 have been applied to like parts in the pump construction and a reference may be had to the description to the motor unit for a full understanding of the mechanical construction of the pump parts. Backing plate 121' of the pump is supported on trunnion 138 and journals 139 which are in turn supported in the cap 314 of the pump casing in a manner that will be obvious to those skilled in the art. If a fixed pressure piston pump of this type is desired the backing plate 121' may be anchored at a fixed angle with relation to the casing section 311 and 314. As is well understood in the art, by varying the angle of the plate 121' the stroke of pistons 115 and accordingly the pressure which may be developed by the pump varies so long as the stroke of the pistons is of sufficient length to permit a suction to be developed which will draw fluid from the low pressure chamber 275 through the inlet port 269 into the pump cylinders. To provide for a variation of the angularity of the backing plate 121' in the pump from its maximum angle to a vertical positon, ears 336 are provided on the backing plate which are connected by means of the pin 337 to one end of the actuating link 338. The opposite end of the actuating link 338 is connected by means of the pin 339 to a slidable sleeve 340 supported on and rotatable with the casing section 311. Extending into an annular channel formed on the periphery of cylinder 340 are the actuating extensions 341 of the actuating rods 342. Rods 342 are slidably supported in suitable openings formed in the stationary casing section 318 and are rigidly secured to the reciprocating pistons 343 supported in cylinders 344 formed integrally with the casing 318. Operating fluid, preferably oil under pressure, is admitted to the cylinders 344 on opposite sides of the pistons 343 through conduits 345 and 346.

In operation of this form of transmission, when the torque demands on the tail shaft 109 of the motor are within the ordinary operating values, oil is admitted through the pipes 346 into the cylinders 344 holding the pistons 343 to the right in Figure 19 and the backing plate 121' of the pump at its maximum angle. The automatic controls of the motor will function to maintain the angle of the backing plate of the motor in proper position to permit the prime mover to handle the normal loads. When the torque demand at the tail shaft is such that the prime mover can handle the load in direct couple, the dogging member 327 is shifted to the right in Figure 19, preferably in automatic manner, as hereinbefore set forth, and the power is then transmitted by direct mechanical connection from the prime mover to the tail shaft. When, however, an overload demand for torque is made on the tail shaft, the backing plate of the motor is shifted to its position of maximum angularity. The operator may force fluid or oil under pressure into the cylinders 344 through pipes 345 exhausting oil from the opposite sides of the pistons through the pipes 346 in this manner causing the pistons 343 to move to the left in Figure 19, and shifting the sleeve 340 through the actuating rods 342. As the sleeve 340 shifts to the left, link 338 will move the backing plate 121' of the pump which is balanced towards vertical position. This will decrease the stroke of the pump and the power of the prime mover being constant the pressures delivered by the pump to the high pressure chamber 233 will be increased. Increased pressures of the fluid will increase the torque which the motor applies to the tail shaft with the result that an overload may be handled. When the overload demand is removed and the transmission can handle the load with the normal torque multiplication ratio, the pistons 343 are shifted to the right and the parts returned to the position shown in Figure 19. The various positions of the pistons 343 is preferably maintained by locking the fluid in the cylinders 344 so that the backing plate 121' and will be held rigidly against possible fluctuation in position by hydraulic locks. While the operating fluid for cylinders 344 may be controlled manually an automatic control such as is shown for controlling the backing plate of the motor unit is preferably provided in which the tension of the control spring 169 (Figure 10) is set so that this control will become operative only when a pressure sufficient to shift the motor plate to a position of maximum angularity is reached. The automatic pump control then becomes effective to decrease the angularity of the pump backing plate until the prime mover can handle the over-load on the tail shaft. The application of my improved automatic control to the pump unit will be obvious to those skilled in the art in view of the description given in connection with the control of the motor backing plate and further details will not here be given for this reason. When the angularity of the pump backing plate is automatically controlled the system will operate at its maximum efficiency as no dependence will be placed on the operator to establish the transmission ratios. The operator's sole function will be to control the prime mover and to throw out the direct lock or mechanical connections when the speed of the tail shaft begins to fall off due to increase of load thereon while the transmission is in direct couple. By bringing the pump backing plate to vertical position the stroke of the pistons will be reduced to zero and in this way a mechanical neutral position is provided.

In certain types of vehicles, such for example as in rail cars and locomotives, because of limitation in space the length of my improved transmissions may become such as to render it desirable to provide means for taking power off from the transmission between the prime mover or the engine and the pump unit. The arrangements shown are readily adapted for this purpose as shown in Figure 20 and a modification of transmission shown in Figure 19 is disclosed for showing such a driving arrangement especially adapted for locomotive and rail car use. The arrangement of parts shown in Figure 20 is adapted for substitution in the arrangement shown in Figure 19 and to replace the parts shown between the lines Q—Q and Q'—Q' of Figure 19. In this form of invention, the tubular extension 316 of the casing 314 is slidably keyed to extension 347 of a driving pinion 348 mounted for rotation in the ball bearings 349 which in turn are supported in suitable extensions 350 of the stationary casing 318. The pinion 348 meshes with and drives a suitably mounted gear 351 which in turn may drive through suitable connections to the axles of a rail car or locomotive. Secured to the casing section 350 is a cap 352 provided with a stuffing box 353 through which the driving member 354 extends. The driving member 354 is provided with a section 355 on which coupling member 356 is slidably splined. Coupling member 356 is also splined on the end of the shaft section 323 and interconnects the driving member 354 with the driving shaft section 323. The coupling member 356 is actuated by a collar 357 and a suitable actuating arm 358 to shift the teeth 359 formed on the periphery of the coupling member 356 into engagement with driving teeth 360 formed in the pinion 348. When the arm 358 is actuated, preferably under automatic control of the motor, to shift the coupling member 356 to the right in Figure 20 so that teeth 359 mesh with teeth 360, power from prime mover will be transmitted through the coupling member 356 directly to pinion 348 and gear 351 without throwing heavy driving strains on the remainder of the transmission parts.

In the forms of invention so far described, parallel cylinder motors have been disclosed. In Figure 21 a form of the invention is disclosed in which parallel cylinder pump disclosed in the form shown in Figure 19 is utilized in connection with a variable capacity radial cylinder motor. In this form of the invention, the motor unit is interposed between the pump unit and the prime mover, and the bearing 317 for the pump extension 316 is supported in a ring 362. Ring 362 is supported in a central bore in casing 318' and is backed up by connections 363 to pistons 364 supported in cylinders 365 formed in the casing 318'. Fluid from the high pressure side of the system is supplied to the cylinders 365 by means of the conduits 366. The area of the pistons 364 is so proportioned that the entire pump assembly is held to the left in Figure 21 with sufficient pressure to maintain the end face of the cylinder block 93 against the valve plate 267 with sufficient pressure to maintain a suitable seal at the valve plate 267 but without causing excessive bearing pressures to develop. The pump parts are held in position against valve plate 267 by means of the springs 367 when no fluid pressures are developed in the system. To provide for a mechanical connection between the extension 316 of the pump casing and the tail shaft section 368 a coupling member 369 actuated by supporting collar 370 and the arm 371 is slidably splined to the interior of the extension 316 and is provided with interior teeth 372 adapted to mesh with driving teeth 373 of a coupling member 374 keyed to the end of the driving shaft section 323. Fluid under pressure from the pump is delivered to the high pressure chamber 273 of the valve 272 and passes from the chamber 273 to the port 88 in the end face of valve 272 into the ports 373 of the radial cylinders 374. An odd number of uniform sized and evenly spaced cylinders 374, preferably nine or more, are formed integrally in the cylinder block 375, the port arrangement in the end valve face being as shown in Figures 5 and 6 for the parallel cylinder motors. Mounted for reciprocation in each of the cylinders 374 are pistons 376 which are connected by the wrist pins 377 to the rings 378. Rings 378 are supported on ball bearings 379 in the adjustable stationary plates 380. Plates 380 are connected by means of bolts 381 to a supporting collar 382 which in turn is supported on the actuating rods or extensions 383 slidably supported in the casing section 384. Any suitable means may be provided for adjusting the actuating extensions 383 of the supporting collar 382 with respect to casing 384 to vary the eccentricity of the rings 378 and to effect a corresponding variation in the stroke of the pistons 376 as will hereafter more fully appear. Cylinder block 375 is slidably splined on a tubular extension or sleeve 385 formed integrally with the valve plate 267 and the outer end of sleeve 385 is supported by bearing 386 in the casing section 384. Formed in the end of casing section 384 is a packing gland 387 through which the driving shaft section 388 extends. Driving shaft 388 at its forward end is provided with a driving flange 389 and at its opposite end is provided with a splined section 390 which fits into the pump coupling member 95. Shaft section 388 extends through sleeve 385 of the valve plate 267 and is supported in the ball bearing 391 mounted in the valve plate 267.

In operation of this form of the invention, the driving flange 289 is actuated by the prime mover and rotates the pump unit through the coupling member 95 and the central drive member 129 causing the pumping of fluid by the pump piston 115. Pressures are built up in the high pressure chamber 273 from which the high pressure fluid passes through ports 88 and 373 to the radial motor cylinders 374 forcing the pistons 376 outward. The pressure of pistons 376 is transmitted through wrist pins 377 to the bearings 379 and to the rings 378 resulting in a reaction tending to rotate the cylinder block 375. The reaction on the cylinder block will depend upon the amount of eccentricity of the rings 378 with relation to the driving shaft 388 which is adjusted through the actuating extensions 383 to give sufficient torque reaction on the cylinder block 375 to start the cylinder block into rotation. Rotation of cylinder block 375 drives the sleeve 385 which in turn drives valve plate 267, pump casing sections 311 and 314, backing plate 121' for the pump, and through the extension 316 drives the coupling member 369 and the tail shaft section 368. As the speed of rotation of pump casing together with the backing plate and tail shaft increases, the volume of fluid pumped will decrease and the extensions 383 may be adjusted to decrease the stroke of the motor pistons 376 until when the tail shaft is rotating at the same speed as the driving shaft, the stroke of the motor pistons 376 will be decreased to zero and no pumping of fluid in the system will occur. Under these conditions the dogging member 369 may be shifted to the left in Figure 21 engaging teeth 372 with teeth 373 and a direct mechanical connection will be provided from the driving shaft to the tail shaft.

It will be understood that the valve arrangement for securing the neutral condition of the transmission by interconnecting the ports or chambers 273 and 275, will be substantially the same as heretofore set forth in connection with the valve bodies in the forms of invention heretofore described. It will also be understood that variation in pressure of the fluid delivered by the pump unit may be effected by shifting the sleeve 340 in the manner heretofore described in connection with Figure 19, or in any other suitable manner, to vary the angularity of the backing plate 121' of the pump unit. The remaining operations will be clear from a description of the forms of the invention heretofore given.

Figure 22:
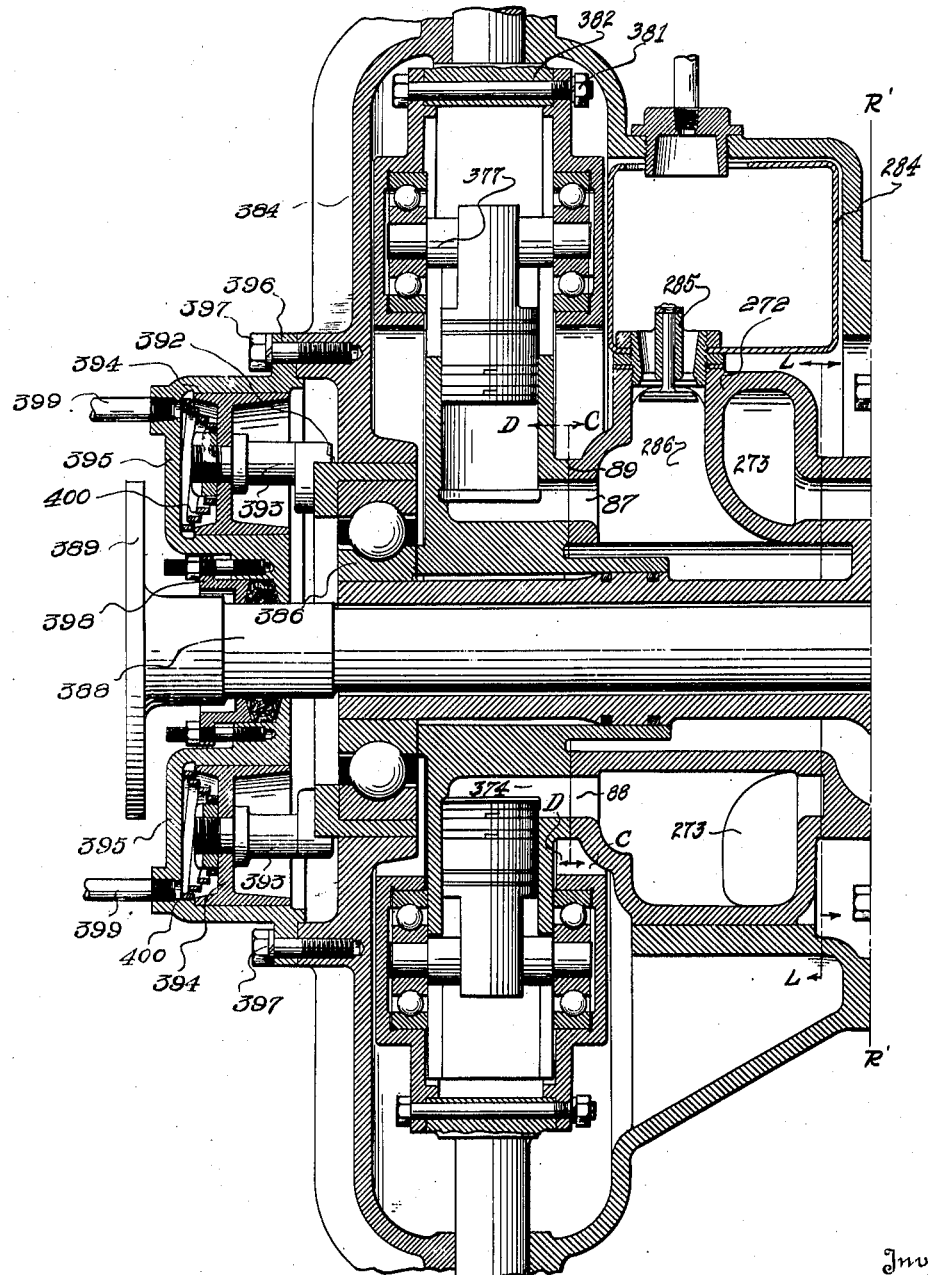
Figure 22 is a fragmental sectional view of a modified arrangement of parts which may be substituted for the parts between the lines R—R and R'—R' of Figure 21.

In Figure 22 a modified arrangement of the form of invention shown in Figure 21 is provided in which the fluid pressure in the system is utilized to hold the motor assembly against valve body 272 with a predetermined pressure. In this form of invention the bearing 386 is supported in a cylindrical sleeve member 392 which in turn is slidably supported in the casing section 384. Cylinder 392 is rigidly secured to piston rods 393 which in turn are secured to the actuating piston 394. Pistons 394 are mounted in cylinders 395 which in turn are formed integrally in a cap 396 secured to casing section 384 by means of the studs 397. The drive shaft section 388 extends through a packing gland 398 in the cap 396. Fluid under pressure from the high pressure chamber of the circulating system is admitted to the cylinders 395 through conduits 399 forcing the entire motor assembly to the right against the valve face 89 of valve body 272 with sufficient pressure to hold the parts in sealing relation but without permitting excessive bearing pressures to develop against the face 89. When no pressures are being developed in the system, the pistons 394 are held to the right in Figure 22 by means of the springs 400. The remaining construction of this form of the invention and the operation thereof is the same as set forth in connection with Figure 21 to which a reference may be had for a full understanding thereof.

The form of invention shown in Figure 19 may be modified for use as a bus, automobile, and like transmissions by providing arrangements in which the backing plate 121' of the pump may be shifted manually by the operator. When applied for such uses, arrangements are preferably made to permit shifting of the backing plate past the vertical position and to give it an inclination with the vertical position opposite to that shown in Figure 19 for purposes of reversing the rotation of the tail shaft. For running forward under normal conditions, the backing plate 121' is shifted clockwise in Figure 19 to its maximum angular inclination with the vertical position. When unusual torque demands are made on the tail shaft, the operator may increase the pressure delivered by the pump and accordingly increase the torque ratios by shifting the angle of the pump backing plate 121' toward vertical position until the engine can handle the load.

By bringing the pump backing plate into vertical position, no pressure will be delivered by the pump and mechanical disconnection between the driving and the tail shaft may be effected for starting the engine when cold. When it is desired to reverse the vehicle, the pump backing plate is rotated counter clockwise beyond the vertical position. The chamber 273 will then become the low pressure chamber while the chamber 275 becomes the high pressure chamber. As a result, low pressure fluid will be connected to conduit 177 (Figure 10), high pressure fluid will be delivered through conduit 178 to the automatic motor control mechanism forcing the valve 167 against the cap 168. Piston 159 will be actuated forcing the angle plate 121 of the motor unit to its position of maximum angularity. The system will then operate as a straight pump and motor unit with the tail shaft driven in a reverse direction from the driving shaft. The driving effect in reverse will accordingly be directly dependent upon the pressures developed by the pumping unit and may be controlled by varying the angularity of the pump backing plate to give the desired ratio of torque multiplication. To permit shifting of the pump backing plate with the parts at rest the clutch valve 65 may be operated to interconnect the high and low pressure side of the system. When, however, the transmission is in operation the angularity of the pump backing plate may be varied without operating the clutch valve to interconnect the high and low pressure system, if desired, because of the inherently balanced nature of the backing plate under operating pressures. Sudden movement of the pump backing plate due to air or other causes is taken care of by making collar 340 a sufficiently loose fit on casing 311 so that the collar 340 may cock sufficiently under the operating pressures to lock the angle plate of the pump from further movement. When this arrangement is used the clutch valve must be operated to relieve the pressure before the backing plate may be shifted.

Figure 24:
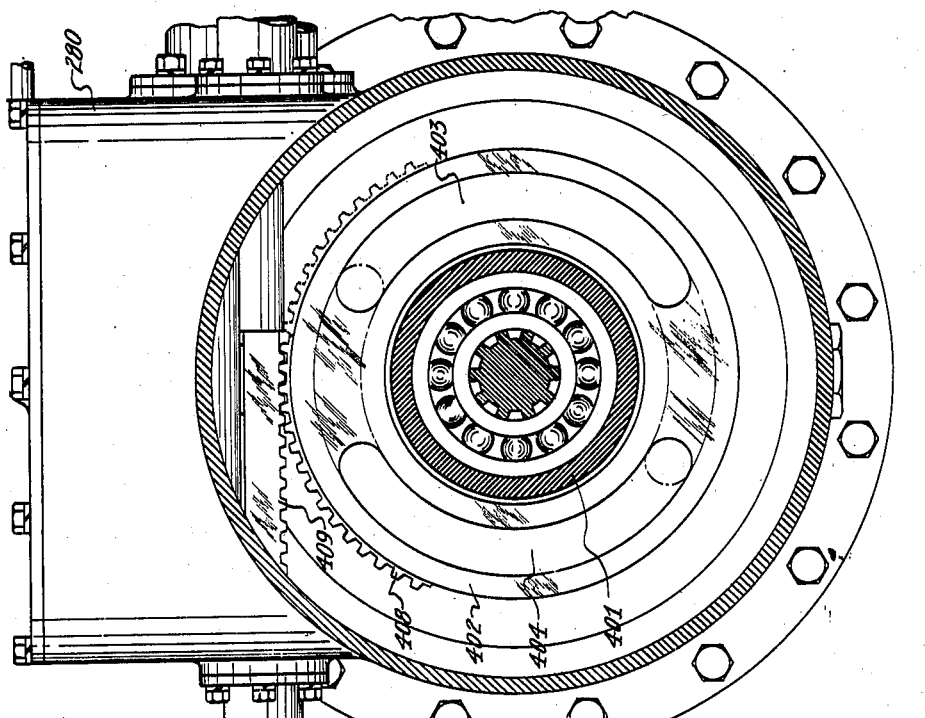
Figure 24 is a sectional view taken along line T—T of Figure 23.
Figure 23:
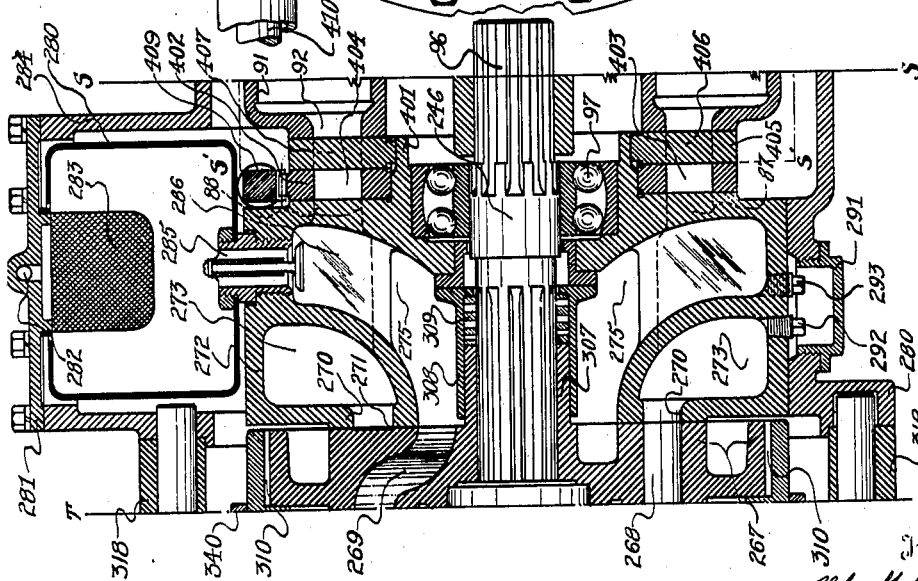
Figure 23 is a fragmental sectional view showing a modified arrangement of clutch valving.

To provide for a simplification of the valve construction, the arrangement of parts shown in Figures 23 and 24 may be used. While this arrangement is obviously applicable to the various forms of transmission shown, it has been especially shown for substitution in the form of invention shown in Figure 19, parts shown in Figures 23 and 24 may be substituted for the parts shown in Figure 19, between the lines T—T and S—S in obvious manner. Like reference numerals have been applied to like parts and a full understanding of the parts not particularly described will be had by reference to a description of the similar parts heretofore given. As shown in Figure 23, the valve member 272 is provided with an integral tubular or cylindrical extension 401 upon which clutch valve plate 402 is slidably journalled for rotation. Plate 402 is provided with the ports 403 and 404 which are the same shape as and normally in alignment with the ports 87 and 88 of the valve 272. Slidably splined or keyed to the extension 401, is a motor timing valve plate 405 in which are formed the ports 406 and 407. Ports 406 and 407 correspond to the shape of and are in alignment with the ports 87 and 88. Formed on the clutch valve plate 402 are the gear teeth 408 meshed with the teeth of a rack 409. Rack 409 is slidably supported in suitable bearing sections of the casing 280 and is actuated in any suitable manner through the extension 410 thereof.

In operation of this form of the invention, with the clutch plate 402 positioned so that the ports 403 and 404 are in alignment with the ports 87 and 406, and 88 and 407, respectively, the parts are in power transmitting relation. When it is desired to interconnect the high and low pressure ports in the system to connect the transmission in neutral, the clutch plate 402 is shifted clockwise in Figure 24 by actuation of the rack 409 until the ports 402 and 403 are moved to the position indicated by the dotted lines in Figure 24, in which position the high and low pressure ports 87 and 88 will be interconnected by the ports 403 and 404. It is to be noted that in this form of the invention, the chambers in the stationary valve member 272 are substantially circular in nature and easily constructed and the operating pressure of the motor unit will hold the valve plates 402 and 405 in sealing relation. In this way a simplified neutral valve arrangement is provided which is especially adapted for use when the variable pump is utilized, but may also be utilized with other forms of transmissions disclosed.

It will be noted in all of the forms of invention described, valve arrangements are utilized, the principles of which are common, the details only being varied in accordance with the variations of the design of the pump and motor units. It will be apparent to those skilled in the art that various novel combinations and many detailed improvements in the construction have been provided which are useful in independent relation and may be varied widely without departing from the spirit of the invention.

Accordingly, having described the preferred embodiments only of the invention, what is desired to be secured by Letters Patent and is claimed as new is:

1. In a fluid operated variable speed power transmission, a driving shaft; a driven shaft; a fluid pump comprising a ring gear secured to said driving shaft and a pinion meshing therewith supported on said driven shaft; a fluid motor; a stationary valve member timing said fluid motor, said driven shaft being actuated by said motor and extending through said stationary valve member; and a pump timing valve member actuated by said driven shaft.

2. In a fluid operated variable speed power transmission, a driving shaft; a driven shaft; a fluid pump comprising a plurality of radial cylinders actuated by said driving shaft, and a plurality of reciprocating pistons supported on said driven shaft; a fluid motor; a stationary valve member timing said fluid motor; said driven shaft being actuated by said motor and extending through said stationary valve member; and a pump timing valve member actuated by said driven shaft.

3. A hydraulic transmission comprising a driving shaft; a plurality of radial cylinders driven by said driving shaft; a driven shaft; a plurality of pistons reciprocating in said radial cylinders, and connected to said driven shaft; a valve timing member for said cylinders driven by said driving shaft; and a parallel cylinder motor operated by fluid pumped from said radial cylinders and driving said driven shaft.

4. In a hydraulic transmission; a driving shaft; a driven shaft; a pump comprising coacting pump elements driven by said driving and said driven shafts; and a high pressure fluid chamber surrounding said pump elements to which fluid is delivered by said pump elements; said pump elements being held in sealing relation by the fluid pressure in said high pressure chamber; a motor for driving said driven shaft; and means for distributing fluid between said pump and said motor.

5. The combination as set forth in claim 4 in which said pump elements comprise radial cylinders and radial pistons.

6. The combination as set forth in claim 4 in which said pump elements comprise radial cylinders rotated by said driving shaft and radial pistons actuated by said driven shaft.

7. In a hydraulic transmission, a driving shaft; a driven shaft; a fluid motor the volumetric capacity of which is variable through an infinite number of successive values and automatically controlled by fluid pressures, actuating said driven shaft; a pump driven by said driving shaft supplying actuating fluid to said motor; means to lock said driving and said driven shafts together; and means for actuating said locking means under the control of said motor.

8. The combination as set forth in claim 7 in which said last mentioned means is actuated under manual control to disconnect said driving and said driven shafts.

9. The combination as set forth in claim 7 in which said locking means comprises a fluid control valve.

10. The combination as set forth in claim 7 in which said locking means comprises a mechanical coupling between said driving and said driven shaft.

11. The combination as set forth in claim 7 together with means for varying the pressures at which said automatic control means function.

12. In a hydraulic transmission, a driving member; a driven member; a pump actuated by the difference in rotation of said driving and said driven members comprising substantially parallel side wall members mounted in a manner permitting movement towards and away from each other; one of said wall members being provided with a plane surfaced ported timing face; fluid receiving and distributing means through which fluid is circulated by said pump and means urging one of said wall members towards the other and holding said timing face in fluid sealing relationship with said distributing means in operation of the transmission; and means for causing the rotation of said driven shaft, said means being operable in response to fluid pressures developed by said pump.

13. The combination as set forth in claim 12 in which said urging means utilizes fluid pressures developed by said pump for urging said side wall members toward each other.

14. The combination as set forth in claim 12 in which said urging means utilizes spring pressures and fluid pressures to urge said side wall members towards each other.

15. A hydraulic transmission comprising driving means; driven means; a rotary gear pump actuated by the difference in rotation of said driving and said driven means and having side wall members held in substantial fluid sealing relationship by fluid pressures, one of said wall members being provided with a plane surfaced ported fluid timing face; a fluid motor embodying a plurality of parts driving said driven means; fluid receiving and distributing means interposed between said pump and said motor; said motor parts being held in operative relationship with respect to each other and said fluid receiving and distributing means by fluid pressures developed by said pump during power transmitting operations.

16. A hydraulic transmission comprising driving means; driven means; a gear pump actuated by the difference in rotation between said driving and said driven means and provided with a plane surfaced ported timing face; a stationary fluid receiving and distributing means engaged by said timing face comprising high and low pressure fluid chambers through which fluid is circulated by said pump; and a motor actuated by fluid circulated therethrough from said stationary distributing means embodying a plurality of parts driving said driven member, said motor parts being held in substantial fluid sealing and assembled relation with respect to each other and said fluid receiving and distributing means by fluid pressures developed by said pump during power transmitting operations.

17. The combination as set forth in claim 16 in which said pump parts are separable and held in substantial fluid sealing relationship by the fluid pressures developed in operation of the transmission.

18. The combination as set forth in claim 16 in which said pump parts are separable and are held in fluid sealing relationship by resilient means when no pressures are being developed by said pump.

19. In combination a driving member; a driven member, a pump comprising a pair of pump side wall members driven by said driving and driven members respectively; pump gears interposed between said side wall members; one of which is rotatable with said driving member and the other being rotatable with said driven member; a motor driving said driven member actuated by fluid delivered thereto by said pump; and means for cutting off fluid circulation between said pump and said motor to cause driving of said driven member through said pump while maintaining substantially low fluid pressures in said motor.

20. A hydraulic torque multiplying transmission comprising a driving member; a driven member; a pump actuated by the difference in rotation of said driving and driven members; a motor, actuated by fluid pressures delivered thereto by said pump, driving said driven member; means for infinitely varying the relative volumetric capacities of said pump and said motor; and means comprising a hydraulic cut off valve for cutting off the application of fluid pressure to said motor from said pump, said means being automatically responsive to a predetermined value of said difference in rotation of the driving and driven members.

21. A hydraulic transmission comprising a driving member; a driven member; a pump comprising complemental pumping elements actuated by the difference in rotation of said driving and said driven members; a motor driven by fluid delivered thereto by said pump, actuating said driven member; means for varying the relative volumetric capacities of said pump and motor through an infinite number of successive ratios; and means comprising a hydraulic cut-off valve for establishing a driving connection between said pump and said driven member by preventing the circulation of fluid between the pump and the motor, said last mentioned means comprising fluid pressure controlled mechanism for closing said valve automatically in response to the attainment of a predetermined motor capacity.

22. A hydraulic transmission comprising a driving member; a driven member; a pump comprising complemental pumping elements actuated by the difference in rotation of said driving and said driven members; a motor driven by fluid delivered thereto by said pump, actuating said driven member; means for varying the relative volumetric capacities of said pump and motor through an infinite number of successive ratios; and means comprising a hydraulic cut-off valve for establishing a driving connection between said pump and said driven member by preventing the circulation of fluid between the pump and the motor, said last mentioned means comprising mechanism for closing said cut-off valve in response to movements of said means for varying the relative volumetric pump and motor capacities.

23. A hydraulic transmission comprising a driving member; a driven member; a pump comprising complemental pumping elements actuated by the difference in rotation of said driving and said driven members; a motor driven by fluid delivered thereto by said pump, actuating said driven member; means for varying the relative volumetric capacities of said pump and motor through an infinite number of successive ratios; and means comprising a hydraulic cut-off valve for establishing a driving connection between said pump and said driven member by preventing the circulation of fluid between the pump and the motor, said last mentioned means comprising mechanism for automatically closing said cut-off valve in response to fluid pressures developed by said pump, and for manually opening said cut-off valve.

24. A hydraulic transmission comprising driving means; driven means; a pump actuated by the difference in rotation of said driving and said driven means; stationary fluid receiving and distributing means provided with low and high pressure passages through which fluid is circulated by said pump; valve means in said stationary distributing means to prevent circulation of fluid through said passages; fluid pressure operated means automatically controlling said valve means in response to a predetermined difference in rotation of said driving and driven means and a hydraulic motor driving said driven means receiving operating fluid through said passages.

25. The combination as set forth in claim 24 together with a valve for interconnecting said high and low pressure passages.

26. The combination as set forth in claim 24 together with manually controlled mechanism for operating said valve means.

27. The combination as set forth in claim 24 in which said valve means is closed automatically by said fluid pressure operated means, together with means for opening the same manually.

28. A torque-multiplying hydraulic transmission comprising a fluid circulating system embodying a pump, a fluid motor, and interconnecting fluid passages between said pump and said motor; mechanism for varying the torque multiplication ratio of the transmission; said mechanism comprising a normally operating portion of the transmission, a valve controlling the fluid flow through said passages; and means responsive to movement of said ratio-varying mechanism for automatically closing said valve.

29. The combination as set forth in claim 28 together with manually operated means for opening said valve.

30. A hydraulic transmission comprising a driving member; a driven member; a pump actuated by said driving member; fluid receiving and distributing means provided with high and low pressure fluid chambers through which fluid is circulated by said pump; a motor driving said driven member through which fluid is circulated from said chambers; a casing section surrounding said motor adapted to retain leakage fluid; a stationary gravity feed tank feeding fluid into said low pressure chamber by gravity; means for returning fluid from said casing section to said tank in operation of the transmission; and an overflow connection from said tank to said casing section.

31. A hydraulic transmission comprising driving means; driven means; a pump actuated by the difference in rotaion of said driving and said driven means; fluid receiving and distributing means provided with low and high pressure fluid chambers through which fluid is circulated by said pump; a variable capacity motor driving said driven means through which fluid is circulated from said chambers; mechanism for automatically varying the capacity of said motor in response to pressures developed by said pump; and control mechanism designed for convenient and instantaneous manipulation during power transmission to regulate the pressures to which said mechanism responds during operation of the transmission.

32. In a fluid operated transmission, driving and driven members; a fluid pump and motor arranged to variably transmit power between said driving and said driven members; means responsive to the fluid pressure generated by said pump normally tending to reduce the ratio of torque multiplaction between said driving and said driven members and operative when the fluid pressure exceeds a predetermined value to increase the torque multiplying ratio between said driving and said driven member; and auxiliary mechanism, including an external device designed to be remotely controlled, for varying the pressures to which said means responds.

33. A fluid operated power transmission comprising a driving and a driven member; a fluid pump operated to pump fluid by the difference in rotation of said driving and said driven members; a variable capacity motor, delivering power to said driven member, actuated by fluid delivered thereto by said pump; means responsive to the fluid pressure generated in said pump normally tending to decrease the volumetric capacity of said motor and operative under predetermined fluid conditions to increase the volumetric capacity of said motor; and mechanism designed for convenient external manipulation to vary, selectively and rapidly, the pressures to which said means responds.

34. In a control apparatus, means movable in a plurality of directions; a supply source of fluid under pressure; means operated by fluid from said supply source to move said first mentioned means in one direction while the pressure of operating fluid is above a predetermined value; resilient means reacting in direct alignment with said fluid-operated means to move said first mentioned means in a different direction when the pressure of the operating fluid goes below a predetermined value; and mechanism, including an adjustable quick-acting device cooperating with said resilient means for varying the pressures to which said means responds.

35. A fluid operated transmission embodying driving and driven members; a pump operated to pump fluid by the difference in rotation of said driving and said driven members; a variable capacity motor delivering power to said driven member and actuated by fluid delivered thereto by said pump; means for varying the capacity of said motor to prevent the fluid pressures from exceeding a predetermined value and for holding the capacity of said motor fixed when and after the fluid pressures reach said predetermined value; and mechanism, including a quick-acting device designed for remote control, for varying the pressures to which said means responds.

36. In a fluid operated transmission comprising driving and driven members; a fluid pump and motor arranged to variably transmit power between said driving and said driven members; means responsive to the fluid pressure delivered by said pump normally tending to decrease the torque ratio between said driving and said driven members and operative when the fluid pressure reaches a predetermined value to hold the torque multiplying ratio between said driving and said driven members at a fixed value; and mechanism, including an external manipulating device designed for remote control, for varying the pressures to which said means responds.

37. In a power transmission, the sub-combination of a variable capacity motor; a shaft driven by said motor; means, external of and auxiliary to said motor and responsive to the fluid pressures delivered to said motor, normally tending to reduce the volumetric capacity of said motor and upon the attainment of predetermined fluid pressure conditions operative to hold the volumetric capacity of said motor at a fixed value; and mechanism, including an exposed device designed for rapid manipulation by remote control, for varying the pressures to which said means responds.

38. In a hydraulic transmission, a driving member; a driven shaft; a fluid pump driven by said driving member; a fluid motor for actuating said driven shaft; a casing surrounding said pump and forming a closed chamber for receiving high pressure fluid from said pump; and distributing ports provided in the wall of said casing for transferring high pressure fluid from said chamber to said motor, and for returning low pressure fluid from said motor to said pump.

39. In a device of the character described, in sub-combination, a driving member; a pump comprising several coacting portions one of which is driven by said driving member; a casing surrounding said pump and forming a chamber for receiving high pressure fluid from said pump during operation thereof; said driven portion of the pump being designed to be forced into sealing engagement with other portions thereof by the fluid pressures in said receiving chamber.

In testimony whereof I affix my signature.

ALDEN G. RAYBURN.